US008230341B2

(12) United States Patent
Friedlander et al.

(10) Patent No.: US 8,230,341 B2
(45) Date of Patent: Jul. 24, 2012

(54) UNIFIED MEDIA DEVICES CONTROLLING USING PRE-DEFINED FUNCTIONAL INTERFACES

(75) Inventors: Meir Friedlander, Palo Alto, CA (US); Michael Fomin, Mountain View, CA (US)

(73) Assignee: Eyecon IP Holding, Grand Cayman (KY)

( * ) Notice: Subject to any disclaimer, the term of this patent is extended or adjusted under 35 U.S.C. 154(b) by 572 days.

(21) Appl. No.: 12/423,240

(22) Filed: Apr. 14, 2009

(65) Prior Publication Data

US 2010/0131848 A1 May 27, 2010

Related U.S. Application Data

(60) Provisional application No. 61/118,340, filed on Nov. 26, 2008.

(51) Int. Cl.
*G06F 3/00* (2006.01)
(52) U.S. Cl. .......................... 715/719; 715/744; 715/745
(58) Field of Classification Search .................. 715/719, 715/762–763, 713, 741–745, 789, 810–811, 715/829
See application file for complete search history.

(56) References Cited

U.S. PATENT DOCUMENTS

| 7,171,344 | B2 * | 1/2007 | Lind ................................ 703/6 |
| 2002/0130834 | A1 * | 9/2002 | Madarasz et al. ............. 345/156 |
| 2004/0027378 | A1 * | 2/2004 | Hays et al. ..................... 345/763 |
| 2006/0159109 | A1 | 7/2006 | Lamkin et al. |
| 2008/0141117 | A1 | 6/2008 | King et al. |
| 2008/0201649 | A1 * | 8/2008 | Mattila et al. ................. 715/763 |
| 2009/0240698 | A1 * | 9/2009 | Shukla et al. ................... 707/10 |

OTHER PUBLICATIONS

PCT International Search Report and Written Opinion, PCT Application No. PCT/US2009/065541, Jan. 21, 2010, nine pages.

* cited by examiner

*Primary Examiner* — Tuyetlien Tran
*Assistant Examiner* — Truc Chuong
(74) *Attorney, Agent, or Firm* — Dov Rosenfeld; Inventek

(57) ABSTRACT

A method (and a computer-readable medium comprising executable instructions for generating a user interface on a display) are disclosed for controlling a plurality of media objects connected to a network. The method displays a subset of a group of predefined functional interfaces. A functional interface comprises one or more user menus and each user menus is associated with at least one media object. The method forwards a user request to a control server and to receive a response to the user request from the control server. A user request comprises one or more user interactions with the subset of the functional interfaces. The method further comprises updating the subset of the functional interfaces on the display screen.

25 Claims, 21 Drawing Sheets

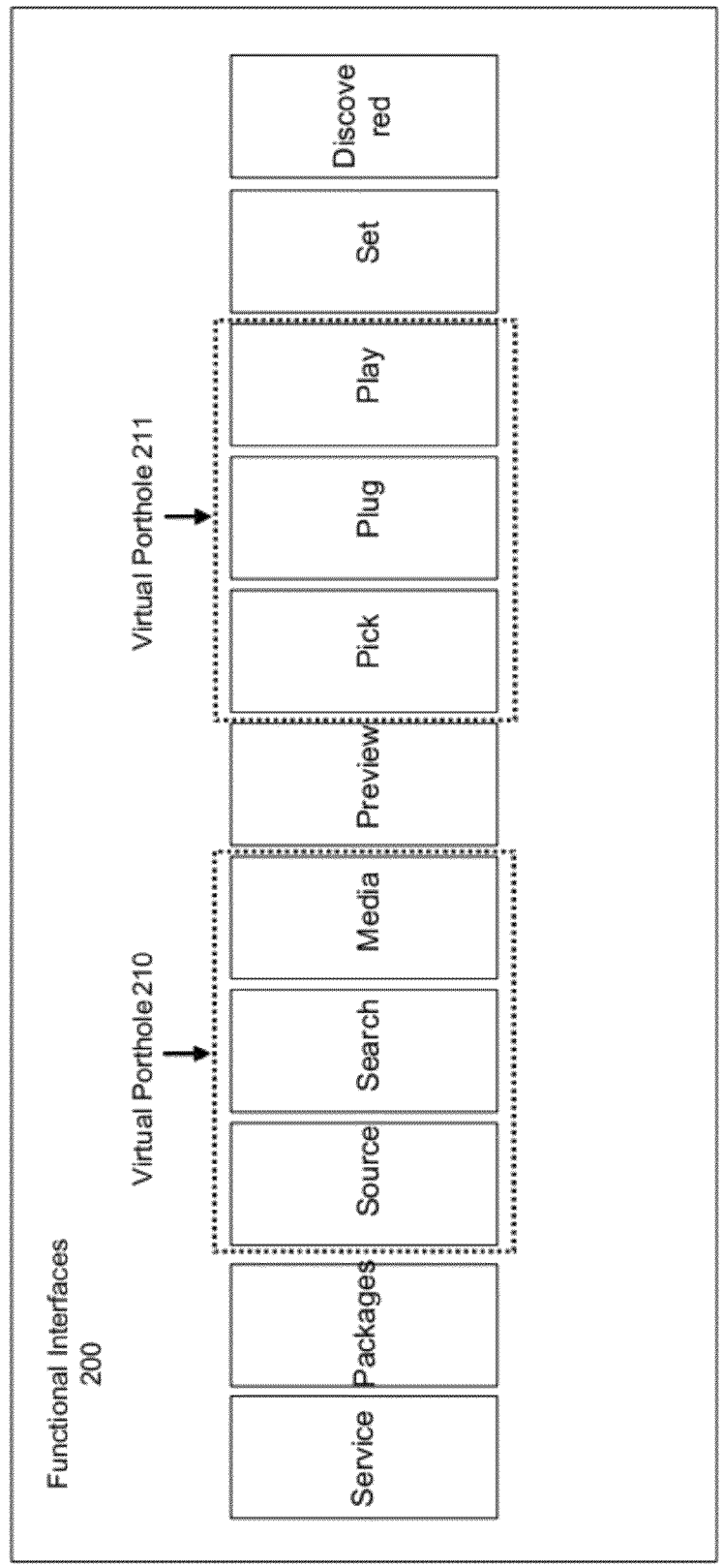
FIG. 2-A

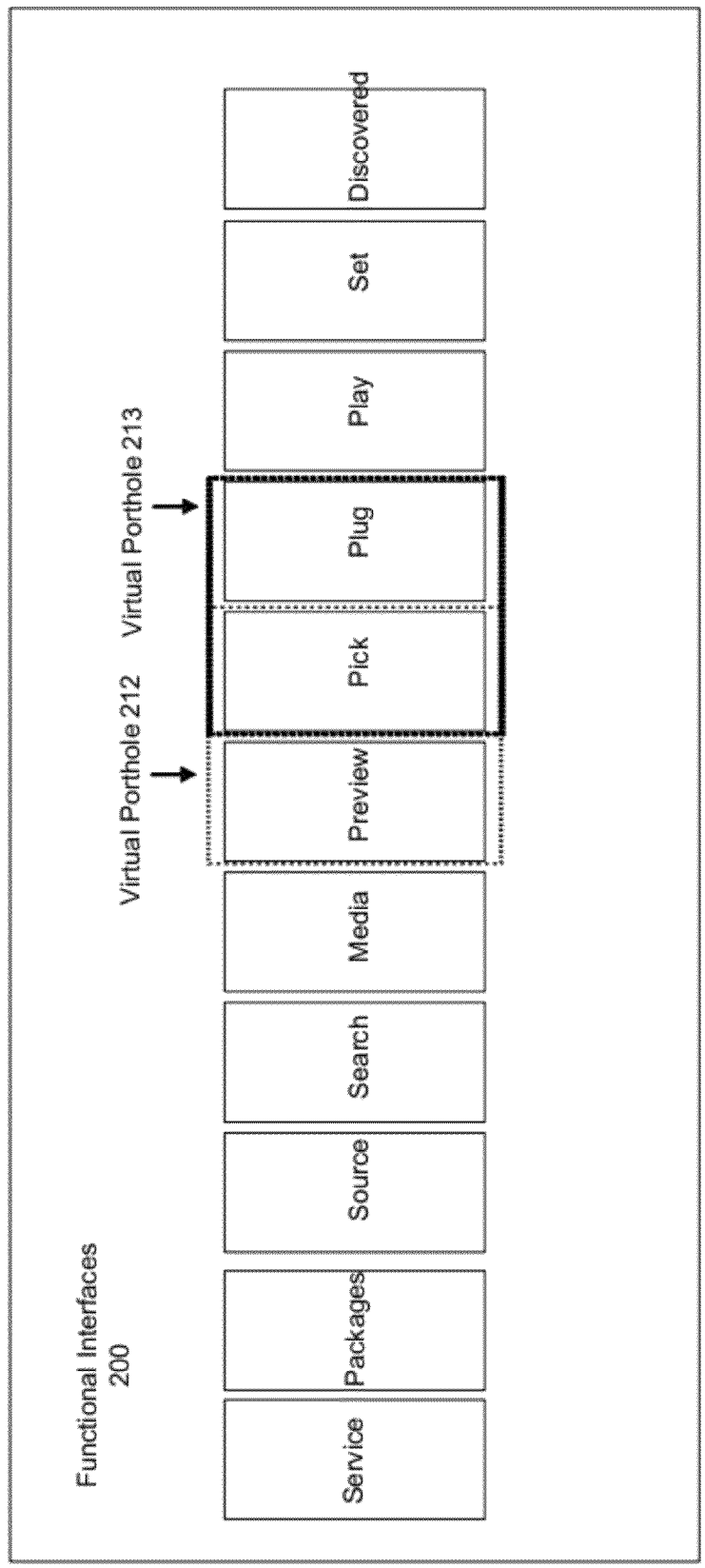
FIG. 2-B

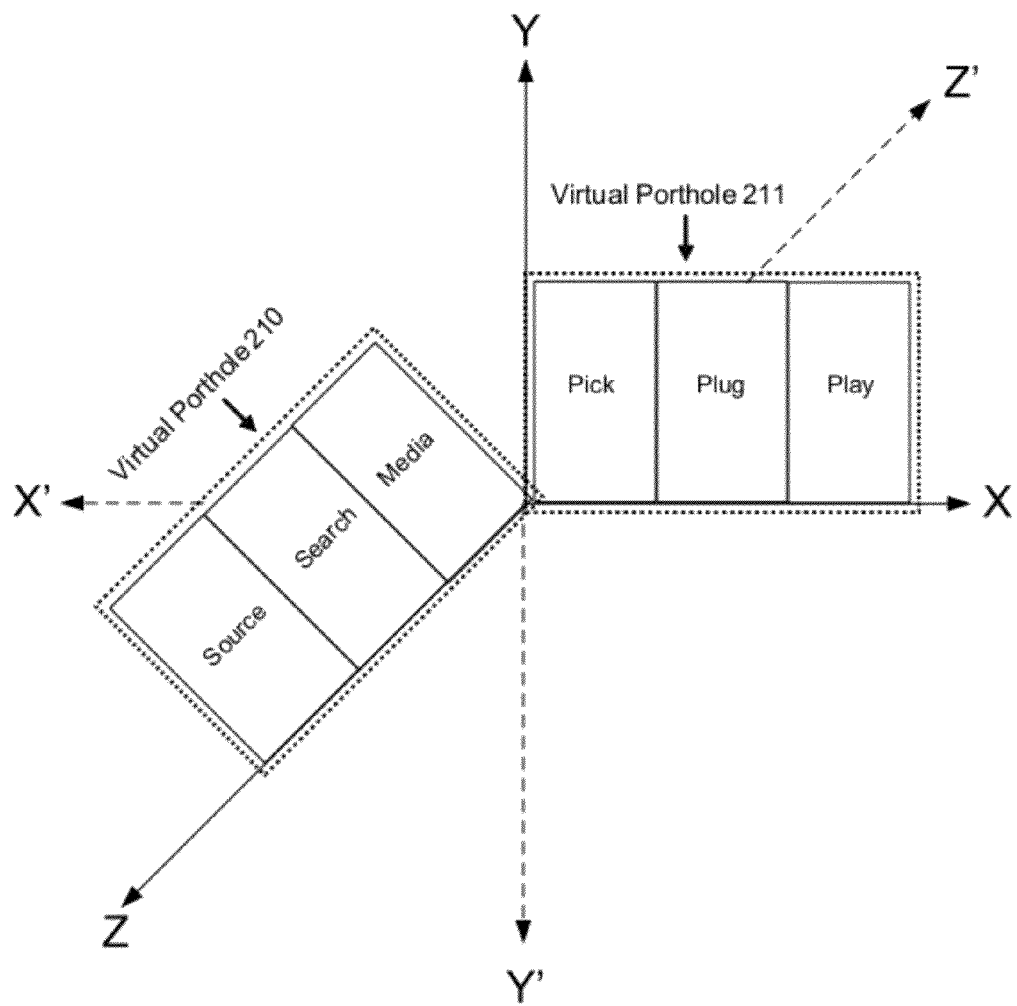
FIG. 2-C

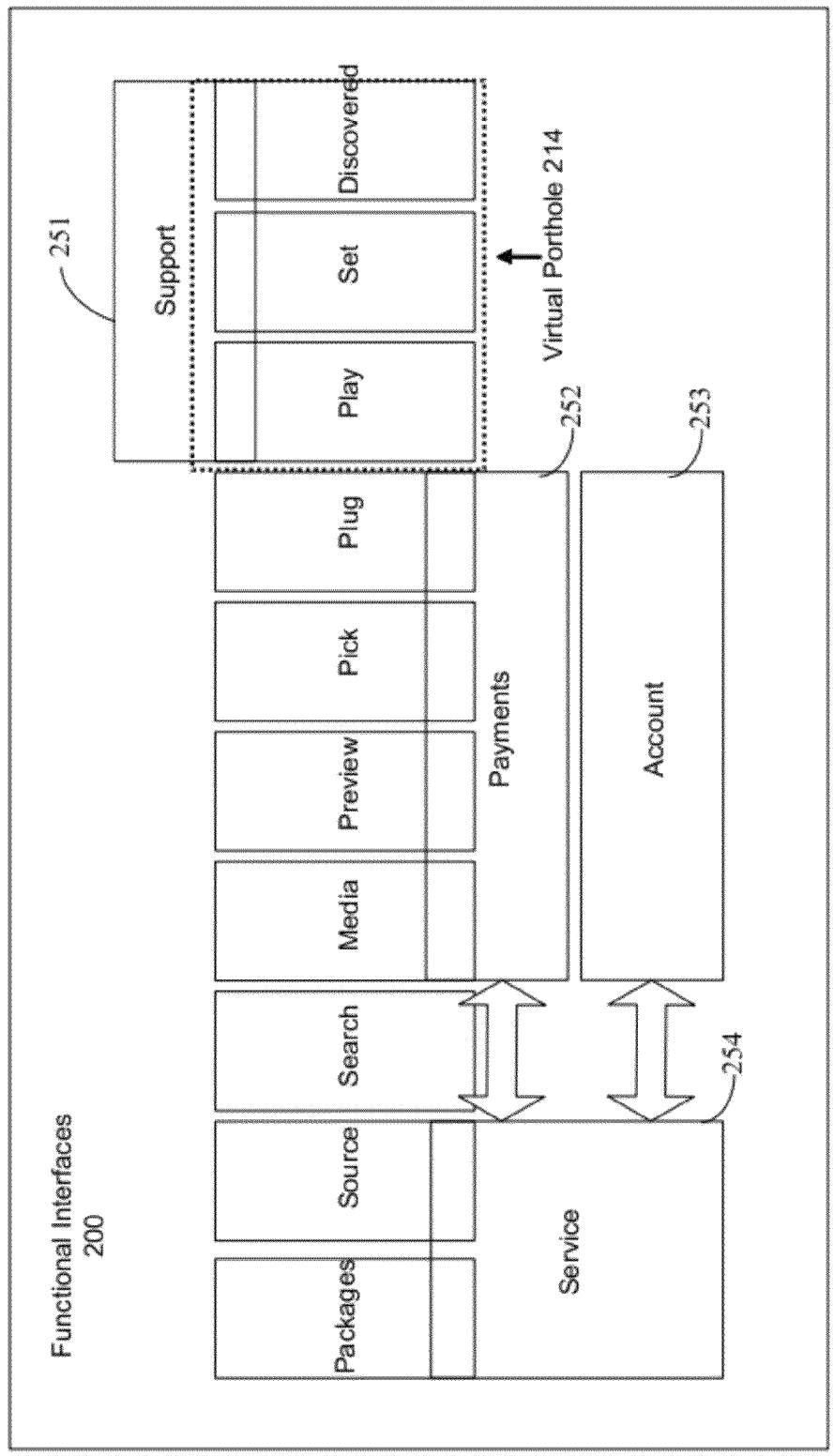
FIG. 2-D

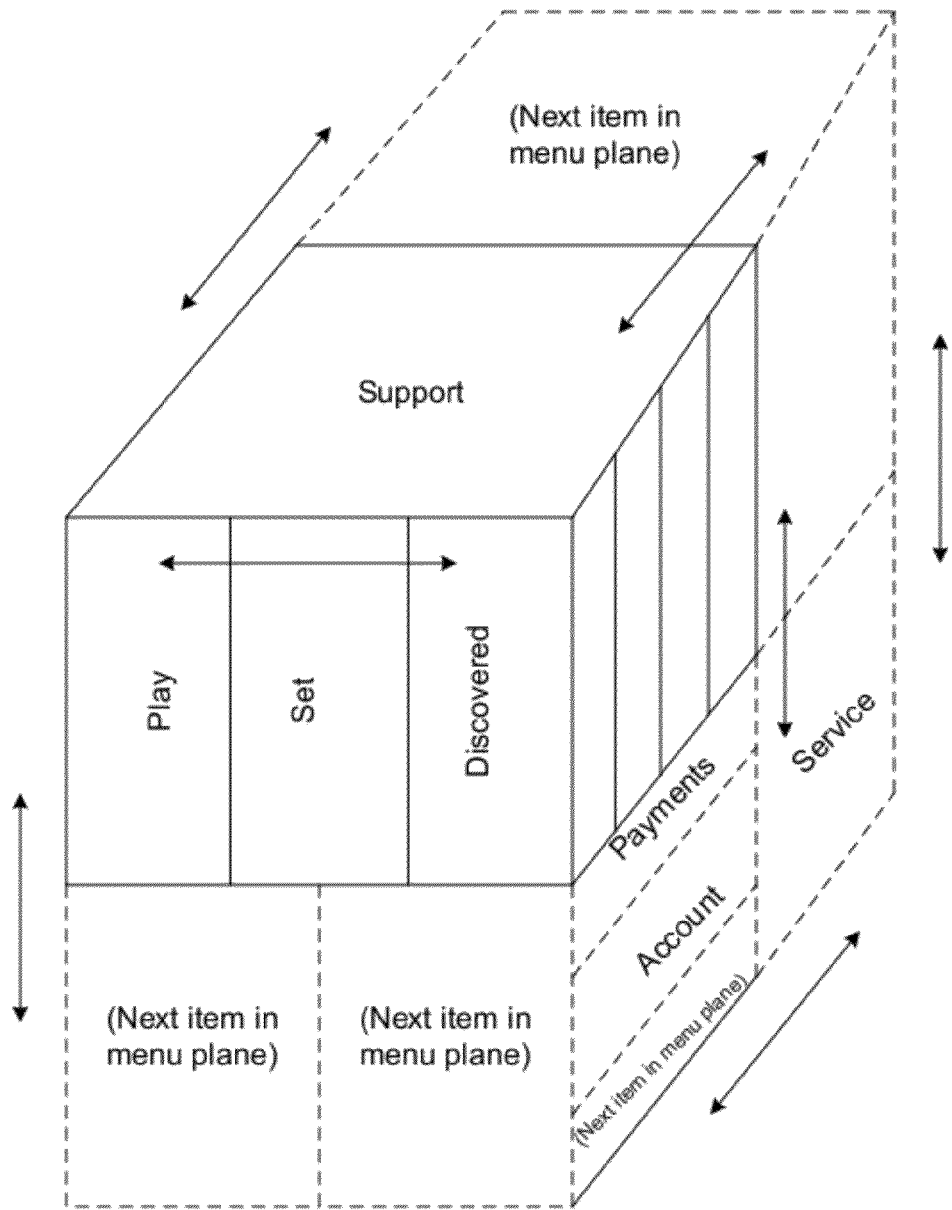
FIG. 2-E

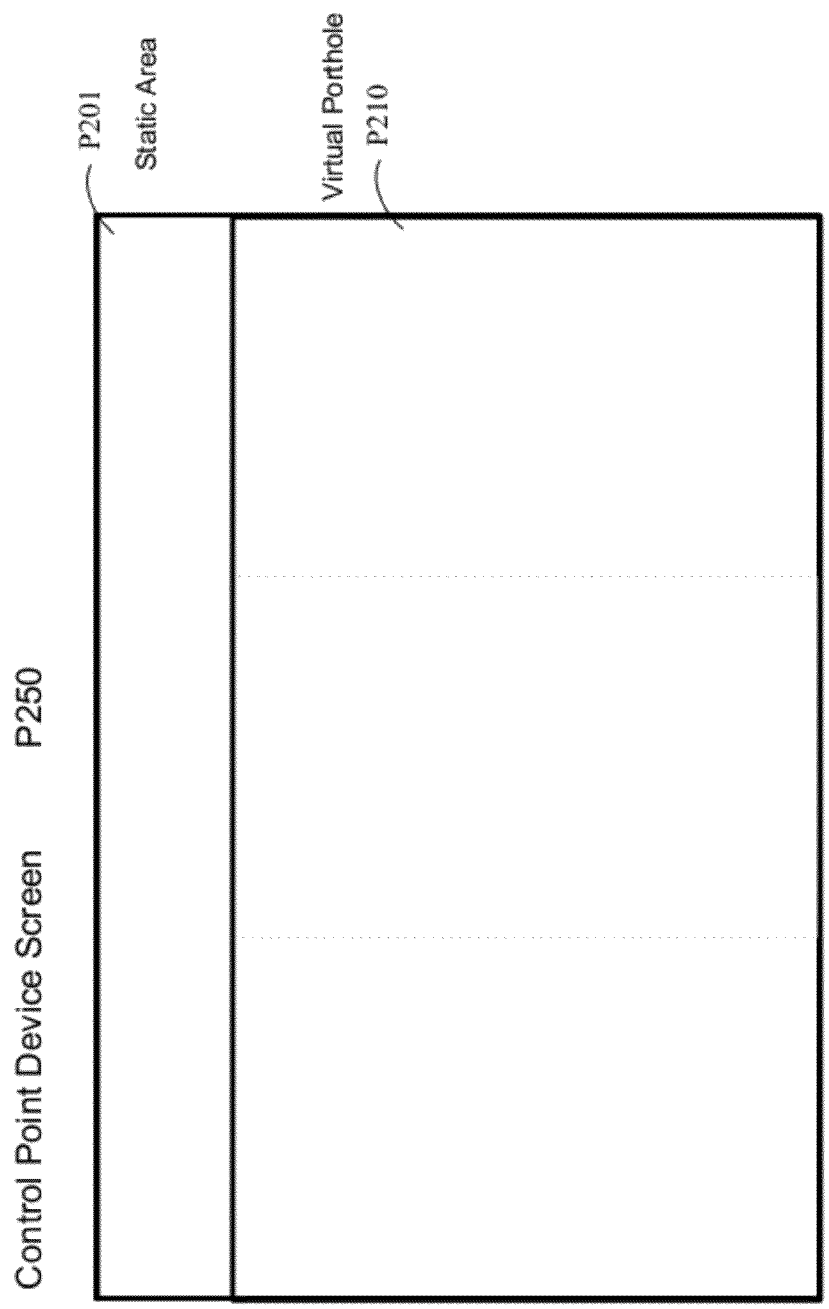

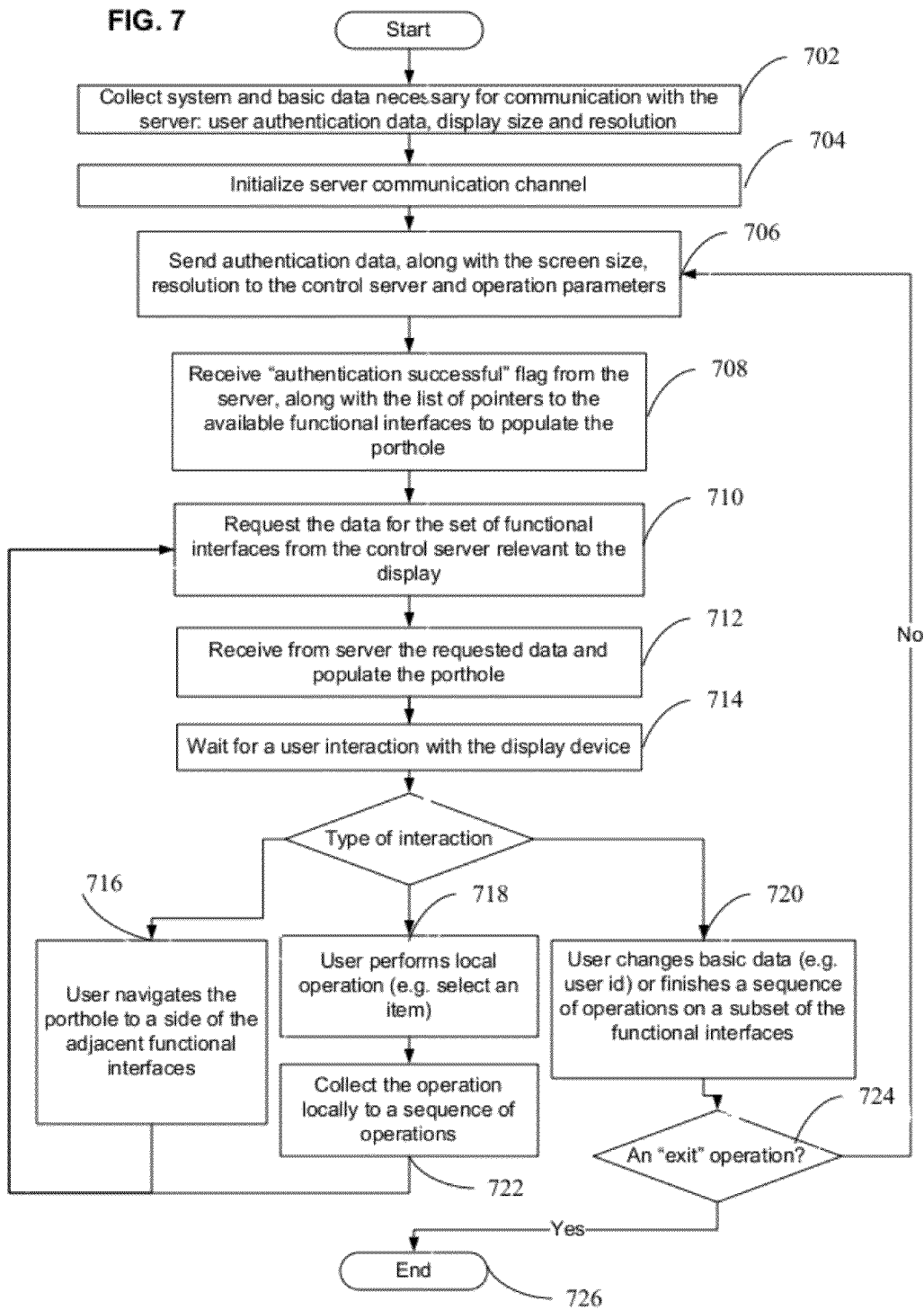

UNIFIED MEDIA DEVICES CONTROLLING USING PRE-DEFINED FUNCTIONAL INTERFACES

REFERENCE TO RELATED APPLICATIONS

This application claims a benefit under 35 U.S.C. §119(e) to U.S. Provisional Patent Application No. 61/118,340, filed on Nov. 26, 2008, entitled "VISUALIZING MEDIA CONTENT NAVIGATION WITH UNIFIED MEDIA DEVICES CONTROLLING" which is incorporated by reference in its entirety.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

BACKGROUND

1. Field of Art

The subject matter relates generally to providing media content services in a networked environment and, more particularly, to visualization of media content navigation with unified media devices controlling in a networked environment.

2. Description of the Related Art

One of the emerging technologies is multimedia home networking. Multimedia home networking enables consumers to share audio, video, and data across multiple media devices (such as televisions, portable media players, cell phones, and computers) using a secure home network. Several media devices associated with playback of media content can be connected in a home network. Media content can be delivered to the home network via a variety of networks, such as wired and wireless networks and the Internet. Cable, satellite, optical network set-top boxes (STBs), television (TV) receivers, radio receivers, computers, and other content receivers or players can receive media content from various media content sources which are local or remote to the home network.

Remote sources include a media server connected to the World Wide Web, or a broadcast system supporting, for example, cable TV, satellite TV, digital TV, or other sources of audiovisual (AV) content. Local sources include DVD recorders and players, compact disc (CD) recorders and players, analog phonograph record players, analog VCRs, digital video recorders (DVRs), analog and digital camcorders, digital cameras, computers, MP3 players, and other storage devices that store media content for playback. Receivers or players can be coupled to plasma monitors, liquid crystal display (LCD) monitors, analog TV monitors, digital picture frames, surround sound systems, speakers, and other playback devices to decode and play media content.

Some or all the above systems may be connected in a network environment, such as a home network. For example, in a home network, several TVs, DVD players or computers may be connected through a local network that receives media content delivered from a remote source. Controlling or scheduling the playback of content on different devices in the network can provide a challenge to an end user. Particularly, each device is implemented to be responsive to control signals generated by a specific control device which is generally provided by the manufacturer of that device. Thus, an end user may have to use several control devices (e.g., remote controls) to operate and use each receiver or player.

Searching of content in different remote or local sources in the network can provide another challenge to an end user. Particularly, some of the playback devices are very inconvenient for content search (e.g. an Internet content search on a TV screen), lacking a proper input device, while others are being used for content playback. Searching in parallel to content play and view disturbs and interrupts other end users. Thus, an end user may have to use several other devices (e.g., a desk top PC) to search for a specific content while juggling with several control devices for content display.

Currently existing solutions to the above described challenges are partial and limited. For example, the existing solutions require end users to partially operate multiple media devices in one control flow. An end user may define media services on a TV, starts a content search on a PC, moves the search result (e.g., a streaming video) to a set-up-box connected to the TV, and watches the streaming video on the TV. The limited control for multiple media devices for content search, content preview and content management is impossible, and in other cases inconvenient, because the user generally has to press several different buttons to control each device. Further, such control devices are not configurable to control the flow of content received by different receivers to different players in the network.

Hence, there is, inter alia, a lack of a system and method that efficiently visualizes media content navigation with unified media devices controlling in a networked environment.

SUMMARY

The disclosed embodiments beneficially allow for a user interface device and methods that efficiently enhance consumer experience of media content on a variety of playback devices. A graphical user interface (GUI)-based media controller provides an intuitive visualization of media content navigation with unified media devices controlling. The GUI-based controller allows a user to access the variety of media content from heterogeneous media content providers and to allow the user to navigate the media content via a wide set of media devices.

In accordance with one embodiment, a method is disclosed for controlling a plurality of media objects connected to a network. The method displays a subset of a group of pre-defined functional interfaces. A functional interface comprises one or more user menus and each user menus is associated with at least one media object. The method forwards a user request to a control server and to receive a response to the user request from the control server. A user request comprises one or more user interactions with the subset of the functional interfaces. The method further comprises updating the subset of the functional interfaces on the display screen.

In accordance with another embodiment, a computing system (and method) is configured for controlling a plurality of media objects connected to a network through a control point is disclosed. The system is further configured for displaying a subset of a group of predefined functional interfaces on a display screen of the control point according to a configuration (e.g., linear, two-dimensional or three-dimensional). The system is also configured for forwarding a user request to a control server. In response to a response to a user request from the control server, the system updates the subset of the functional interfaces on the display screen of the control point based on the response. Thus, a user can navigate media content, search for media resources, discover media playback devices and perform other operations which are offered on a variety of electronic devices through a single control point.

In accordance with another embodiment, a computing system (and method) is configured for facilitating controlling of a plurality of electronic devices connected to a network through a control server is disclosed. The computing system allows the control server to receive a user request from a control point, construct a response to the user request based on the type of the user action and forward the response to the control point.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (or FIG.) 1 illustrates an exemplary network environment for visualizing media content with unified media device controlling, in accordance with one embodiment.

FIG. 2A is a block diagram of a set of functional interfaces in a predefined interface arrangement, in accordance with one embodiment.

FIG. 2B a block diagram of a set of functional interfaces in a predefined interface arrangement after user interaction with the functional interfaces, in accordance with one embodiment.

FIG. 2C is a block diagram of a set of functional interfaces in a predefined three-dimensional arrangement, in accordance with one embodiment.

FIG. 2D is a block diagram of various functional interfaces in a predefined three-dimensional arrangement, in accordance with another embodiment.

FIG. 2E is a block diagram of the various functional interfaces in the predefined three-dimensional arrangement illustrated in FIG. 2D, in accordance with another embodiment.

FIG. 3A is an exemplary graphical user interface of a control point porthole to display media content with unified media device controlling, in accordance with one embodiment.

FIG. 7 is a process of a user interacting with a plurality of functional interfaces via a control server, in accordance with one embodiment.

Where feasible, features, elements, and aspects of the invention that are referenced by the same numerals in different figures represent the same, equivalent, or similar features, elements, or aspects, in accordance with one or more embodiments.

DETAILED DESCRIPTION

Figure 1:
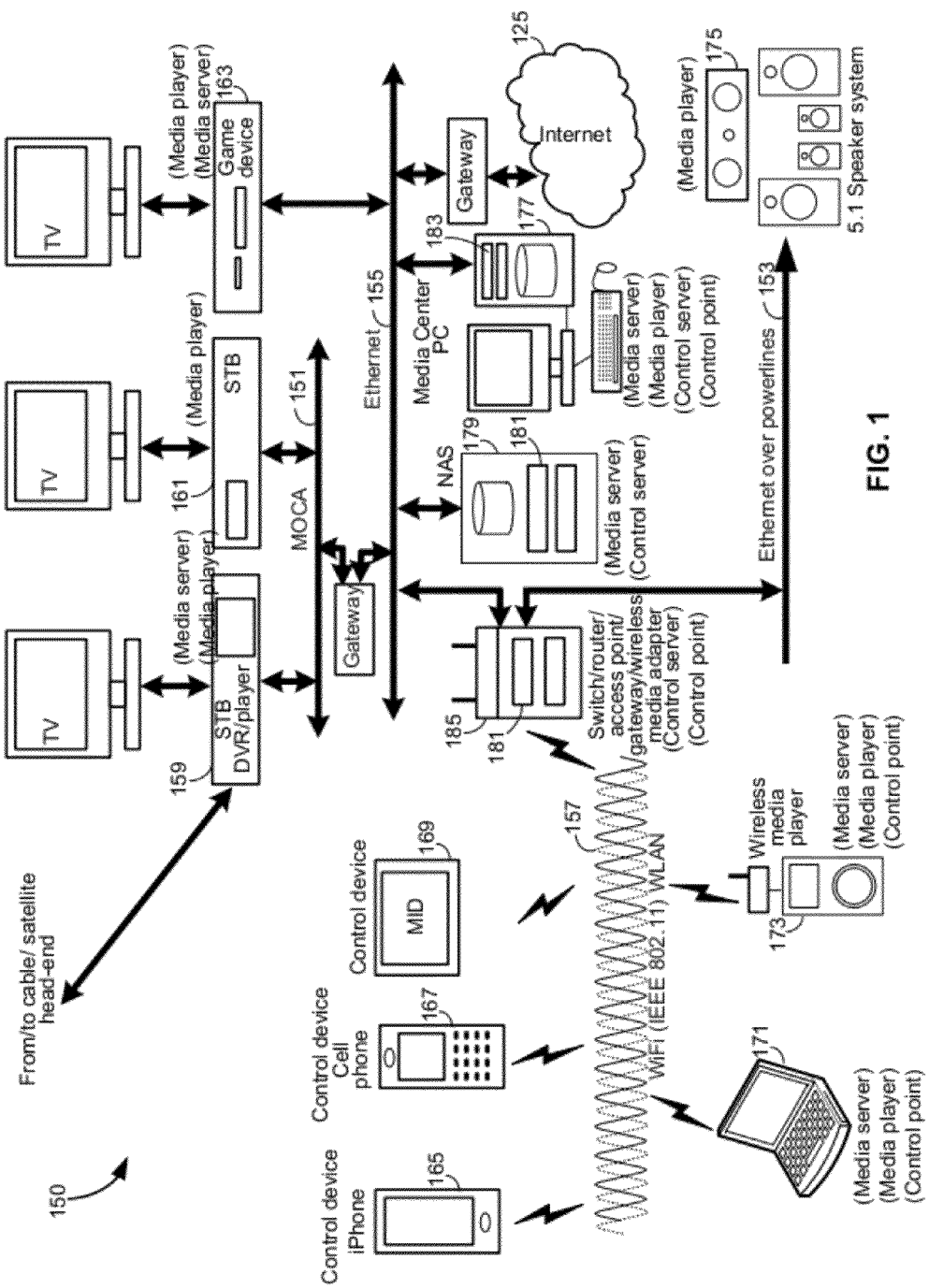

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure (FIG.) 1 is an exemplary network environment 150 for visualizing media content through a media device or a media application operational on the media device with unified media device controlling in accordance with one embodiment. The environment 150 comprises a Media over Coax (MOCA) network 151, an Ethernet over power lines network 153, a wired local area network (WLAN) 155, and a wireless network 157 (e.g., a Wi-Fi network that conforms to the IEEE 802.11 standard). For ease of discussion, the WLAN 155 will be referenced as an Ethernet connection. The environment 150 also comprises a connection to the Internet 125. Coupled to the Internet 125 may be one or more servers 177 comprising one or more databases for storing media content.

The environment 150 comprises media devices such as a set-top box (STB) and a digital video recorder (DVR) combination 159 that is coupled via cable to a cable headend and to the MOCA network 151. The STB/DVR player 159 is capable of playback of media content and is also a source for media content, and may act as a media server in a Universal Plug and Play (UPnP) context. In one embodiment, media devices in the network environment 150 conform to the UPnP standard. An example of a role of each media device under the UPnP standard is shown in parentheses in FIG. 1.

The environment 150 also comprises a first STB 161 and a second STB 163 that are coupled to the MOCA network 151. Each of these is a media player in the UPnP context and is coupled to a monitor for viewing media content. The MOCA network 151 is coupled to the Ethernet 155. Coupled to the Ethernet 155 is a network attached storage device (NAS) 179 for storing media content. The NAS device 179 can be used as a media server in the UPnP context, and can be configured to send content for playback to a playback device in the out-of-band channel.

In one embodiment, the NAS device 179 comprises logic 181 that when executed implements an embodiment of a control server. A control server, for example, may be any device or module for controlling media devices in network environment 150. A control point, for example, may be any device or module connected to a control server that implements a user interface for controlling media devices in network environment 150. In some embodiments, the control server and the control point may be the same device.

Also coupled to the Ethernet 155 is a personal computer (PC) 177 that may be configured in the UPnP context to act as at least one of a media server, a media store source configurable to send media content to a media player, a media player to play content, a control server, or a control point, in accordance with one embodiment. The PC 177 may also comprise logic 183 that when executed on a processor of the PC 177 implements the control server and the control point connected to the control server.

The Ethernet 155 is also coupled to the Internet 125 and the Ethernet over powerlines network 153. A speaker system 175, which acts as a media player in the UPnP context, is coupled to the Ethernet over powerlines network 153. Also coupled to the Ethernet 155 is a wireless network access point 185 for the wireless network 157. In one embodiment, the wireless network access point 185 also acts as a switch, router, or gateway for other networks.

The wireless network access point 185 may also be operable as a wireless control server that acts as a control point in the UPnP context. A wireless control device 169 may communicate with the wireless media adapter 185 to control one or more of the devices and locate content in one or another media server. In one embodiment, the wireless media adapter 185 includes a processor and a memory for storing logic code 187 that when executed on the processor of the wireless media adapter 185 implements a control server.

Several portable devices are coupled to the wireless network 157, as shown in FIG. 1. A laptop PC 171 and a wireless portable media player 173 (e.g., an audio or video player) are operable to be coupled to the WLAN 155. Each of these may act as a media server, a media player, or a control point in the UPnP context. Also coupled to the wireless network 157 are portable devices that may be used as control devices. Each of the portable devices may be operable to communicate with a control server to provide remote control functionality to one or more media server or media player devices or locate and play content. It is noted that although the examples herein are described in the context of a wireless portable media player 173, in alternate embodiments the media player may be a wired media player.

The portable devices may comprise a voice-over-IP (VoIP) phone 167, a touch screen mobile (or cellular) phone 165, or a hand-held computer 169 (e.g., a mobile Internet device (MID)), each including a processing system and software to implement media control interface functionality, and other optional components to store and play media content, so that the devices 165, 167, and 169 may be operable as at least one or more of a control point, media server, or a media player, in the context of UPnP. In some embodiments, remote control functionality may be provided in conjunction with services provided by a control server (e.g., software running on the media center PC 177).

In one or more embodiments, the network environment 150 may not include all the above components or may comprise other components. Also, it should be understood that the systems and methods provided herein are equally applicable to devices that do not conform to the UPnP standard. As provided earlier, a control server may be any device or module for controlling media devices in network environment 150, and a control point may be any device or module connected to a control server that implements a user interface for controlling media devices in network environment 150.

Efficiently controlling the variety of media devices as described above in the network environment needs an intuitive and flexible mechanism. The disclosed configuration includes a method and a system for efficiently controlling a variety of media objects. Examples of a media object includes media devices and media content processed by the media devices. In one embodiment, media content processing by a media device comprises displaying the media content on the media device, controlling interactions with the media content through one or more applications operational on the media device, and enabling media content navigation in an intuitive and flexible way. Other embodiments can include other media content processing operations. The disclosed configuration describes a "graphical world" which consists of functional interface blocks to implement functionalities such as searching for desired content in one device, deciding when and where to play the content and adding new media devices to the network environment 150.

FIG. 2A and FIG. 2B describe multiple functional interfaces 200 in a predefined interface arrangement in accordance with one embodiment. The functional interfaces 200 in a predefined interface arrangement comprise multiple functional modules (hereafter referred to as "functional interfaces") for controlling media objects, for example, media devices and/or media content processed by the media devices in the network environment 150. The functional interfaces may be configured as computer program product instructions that are stored in a computer readable storage medium and executable by a processor of the device with which it is presented and/or interoperates with (including in cases of divided processing). The exemplary functional interfaces include "Service", "Packages", "Source", Search", "Media", "Preview", "Pick", "Plug", "Play", "Set", "Discovered", "Support", "Payment", "Account" and "Service".

"Service" interface allows a user to configure his or her service provider's preferences. "Packages" interface describes the predefined properties of a media source. "Source" interface provides a list of accessible media sources in the network environment 150. "Search" interface describes search filters and search criteria (such as tags or keywords) for the items in the package of a media source. "Media" interface displays the relevant media content items affected by performing a search according to the filters and the criteria upon the selected media sources. An item in the "Media" interface can be a simple item, such as a picture or a song, or a compound item, such as a playlist of pictures or a music album. "Preview" interface allows a user to preview the media content of a selected media item. "Pick" interface provides a list of selected media items, each of which is from an accessible media source. "Plug" interface provides a list of playable media items. "Plug" interface may include playlists from different media sources, of different types and/or in different formats. "Play" interface provides a list of available playback devices and their corresponding controls. "Set" interface allows a user to configure settings for media playback devices. "Discovered" interface allows the user to navigate through a list of all automatically discovered playback devices.

The functional interfaces are defined on one or more control servers and include internal logic, predefined relations to other functional interfaces and a graphical user interface representation that can be displayed as blocks, for example. The functional interfaces are arranged in a predefined linear configuration according to one or more pre-defined logical relationships between the functional interfaces such that a subset of the functional interfaces are displayed on a virtual porthole of the control device in a predefined order (e.g., adjacent to each other). A user action on a user selected functional interface transmits a signal to a server that causes the server to perform user requested action on the selected functional interface. The action can be done within the server and the results transmitted back to the interface or a signal can be sent to the selected functional interface to have the processing configuration where the selected functional interface is operationally perform the action. The user action on the selected functional interface also affects immediate neighboring functional interfaces in various dimensions due to the pre-defined logical relationships between the functional interfaces. An immediate neighboring functional interface of a selected functional interface refers to the functional interfaces immediately adjacent to the selected functional interface in a same plane or in two different planes (e.g., sharing at least one common axis in an x-y-z coordinate system). The pre-defined logical relationships between the functional interfaces are further described with references to FIGS. 2A, 2B, 2C, 2D and 2E.

Depending on implementation, a control server can be configured to allow a user or a programmer to add additional functional interfaces to the exemplary functional interfaces 200 shown in FIG. 2A, FIG. 2B and FIG. 2C. For example, additional functional interfaces can be added to an edge of the predefined configuration or between two existing functional interfaces or in a different plane. In one embodiment, the predefined configuration may be one-dimensional and implemented in a linear arrangement. In another embodiment, the predefined configuration can be defined as a two- or three-dimensional object, suspended in a predefined plane or space subject to user manipulation.

A virtual porthole can be configured to display one or more functional interfaces for controlling media devices in the network environment 150, where different sets of the functional interfaces 200 are configured for controlling different functions of media sources or devices in the network environment 150. The virtual porthole provides a displayable area (view area) of the one or more functional interfaces rendered on a screen of a device (e.g., a control point). For example, the virtual porthole can be rendered on a display screen of a control device, desirably in form of a graphical user interface (GUI). A virtual porthole may be sized to fit in a portion of the display screen or the entire display screen. That is, depending on implementation, the virtual porthole may be rendered on display screens of various configurations (e.g., linear, two-dimensional and three-dimensional) and sizes (length, width and height). In the following, exemplary virtual portholes are disclosed in association with a pure GUI implementation. It is noteworthy, however, that virtual porthole configurations utilizing hardware or a combination of hardware and software (e.g., having hard keypads, spin wheels, or pointing devices) are also possible. For ease of discussion, the terms of "virtual porthole" and "porthole" are used interchangeably from herein and throughout the entire specification.

Referring now to FIG. 2A, FIG. 2A illustrates two virtual portholes (i.e., 210 and 211) configured to display one or more functional interfaces 200 in accordance with one embodiment. The virtual porthole (e.g., 210 and 211) is a "window" into a view of a set of one or more functional interfaces. The virtual porthole 210, 211 can be configured to be any length, width, or height for viewing the functional interfaces that fit within the particular dimensions as defined. In this example, the virtual porthole 210 includes three adjacent functional interfaces Source, Search and Media and the virtual porthole 211 includes the three adjacent functional interfaces Pick, Plug, and Play. With the virtual porthole 210, a user can search for content in selected sources and keep the results for a later view. With the virtual porthole 211, a user may select, play and control media content.

Based on the predefined functional logic between the functional interfaces, a user action in a selected functional interface not only affects the selected functional interface itself, but also affects its immediate neighboring functional interfaces. For example, "Source" interface has an immediate neighboring interface "Search" on its right horizontally. A media source can be selected using a search filter and the search result for the "Source" interface affects the "Search" functional interface, such as causing the "Search" interface to update its search filters associated with the user.

In another example, a user can dynamically edit the list of items in the "Plug" interface, such as queuing a media item from the "Pick" interface into the end of a current list of items, or changing the playback order of the media items. In yet anther example, by making a connection between a media item (simple or compound) from the "Plug" interface and playback device in the "Play" interface, such as drag-and-dropping the media item selected from the "Plug" interface to the "Play" interface, the selected media item starts playing on the connected playback device.

In one embodiment, the virtual porthole 211 displays the current functional interfaces of interest to a user and the virtual porthole 210 is hidden from the view. In response to a user interaction with the current display, e.g., moving away four functional interfaces to the left of the current display (i.e., the virtual porthole 211), the new virtual porthole 210 displays the Source, Search, and Media interfaces instead of the Pick, Plug, and Play interfaces.

The user can navigate through the functional interfaces 200 in a variety of ways. For example, depending on the virtual porthole size, the user can navigate one or more functional interfaces at a time, a portion of a functional interface at a time, or a combination thereof. FIG. 2B shows a virtual porthole 213 that displays two adjacent functional interfaces Pick and Plug, and a virtual porthole 212 that displays two adjacent functional interfaces Preview and Pick. The virtual porthole 212 is displayed in response to user moving one functional interface to the left from the virtual porthole 213. After the move, the new virtual porthole 212 displays Preview and Pick interfaces instead of Pick and Plug interfaces.

In one embodiment, functional interfaces associated with more frequently used functions or operations (i.e., process flows) may be displayed closer to a predefined reference point (e.g., a central position) of a virtual porthole, and functional interfaces associated with less frequently used process flows may be displayed further away from the predefined reference point. In another embodiment, functional interfaces associated with less advanced process flows may be displayed closer to the predefined reference point of the virtual porthole, and functional interfaces associated with more advanced process flows may be displayed further away from the predefined reference point.

FIG. 2C illustrates two virtual portholes (i.e., 210 and 211) configured to display one or more functional interfaces 200 in a predefined three-dimensional arrangement in accordance with one embodiment. The three dimensions are indicated by X-, Y- and Z-coordinates and their corresponding dash-lined coordinates X', Y' and Z'. When the control point is initialized, the virtual porthole 210 ("Pick", "Plug" and "Play") is presented as a set of default functional interface around the center of the three-dimensional space, while the virtual porthole 211 ("Source", "Search" and "Media") for more advanced users is displayed in a space away from the center of the three-dimensional space. Other embodiments may have different configurations of the functional interface 200 in the three-dimensional space illustrated by FIG. 2C.

Depending on implementation and the size of a virtual porthole's display screen, a limited number (e.g., a subset) of functional interfaces may be displayed in the virtual porthole. That is, the virtual porthole 210 may display one or more functional interfaces, a portion of a functional interface, or a combination thereof. In FIG. 2A, for example, three functional interfaces (e.g., Source, Search, and Media) are displayed in the porthole 210, while other functional interfaces (e.g., Preview, Pick, Plug, Play and Set) are hidden from view. As provided in further detail below, a user may interact with the control point to perform an action provided by the displayed functional interfaces or navigate from a set of functional interfaces to another.

FIG. 2D illustrates one virtual porthole 214 configured to display one or more functional interfaces 200 in a predefined three-dimensional arrangement in accordance with one embodiment. In the embodiment illustrated in FIG. 2D, assuming the three-dimension space using an x-y-z coordinate system, the "Support" functional interface 251 in one plane is adjacent to the "Play", "Set" and "Discovered" functional interfaces in another plane and the "Support" functional interface 251 shares an axis in the x-y-z coordinate system. The "Payments", 252, "Accounts", 253 and "Service", 254 are two-dimensionally adjusted along another axis in the x-y-z coordinate system. The "Payments", 252, "Accounts", 253 and "Service", 254 can be in two different planes. The "Services" functional interface is also adjacent to the "Packages" functional interface and to the "Sources" functional interface along the shared axis, and the "Payments" functional interface is also adjacent to the "Media", "Preview", Pick", and "Plug" functional interfaces along the shared axis. For example, a user action on "Play" interface affects the "Support" interface because they are immediate neighboring interfaces although they are in different planes. Similarly, a user action on the "Payments" interface affects the "Media" interface, the "Account" interface and the "Service" interface.

In another embodiment, after the control point is initialized, the virtual porthole of "Pick", "Plug" and "Play" is presented as a set of default functional interface around the center of a three-dimensional space, while the virtual porthole 214 ("Play", "Set" and "Discovered") is displayed two navigation steps to the right from the center of the same Z plane after a user navigated to the right. In this example, a more advanced user may now navigate along the Z axis to the "Support" functional interface in the three-dimensional space. Other embodiments may have different configurations of the functional interface 200 in the three-dimensional space illustrated by FIG. 2D.

In the same embodiment, after the control point is initialized, the virtual porthole "Pick", "Plug" and "Play" is presented as a set of default functional interface around the center of the three-dimensional space. In this example, a more advanced user may now navigate along the Y axis to the "media" preview" and Pick" functional interfaces, then along the Z axis to a "Preview", "Payments" and "Account" functional interfaces and then along the Y axis to the "Payments", "Account" and "Service" functional interfaces in the three-dimensional space. Other embodiments may have different configurations of the functional interface 200 in the three-dimensional space illustrated by FIG. 2D.

FIG. 2E is a block diagram of the various functional interfaces in the predefined three-dimensional arrangement illustrated in FIG. 2D, in accordance with another embodiment. The functional interfaces 200 illustrated in FIG. 2D is displayed in a three-dimensional space represented by a cube. Other embodiments can use other graphical shapes such as a sphere to describe the three-dimensional space. A double-arrowed line along a plane in the embodiment illustrated in FIG. 2E indicates the navigation/movement allowed for that plane.

Predefined functional logic among multiple functional interfaces also affects data consistency among the involved functional interfaces. In one embodiment, the data consistency among multiple functional interfaces is constrained by system parameters associated with the media objects to be controlled by a selected functional interface and its immediate neighboring functional interfaces.

In one embodiment, the number of the functional interfaces 200 displayed may be set according to user preference, the device manufacturer settings, the initial device programming or other factors. In another embodiment, the number of the functional interfaces 200 displayed may be determined automatically by the control point according to size of the display screen, resolution of the display screen, computing capabilities of the control point, for example. For instance, if the control point is a 24 inch TV, then a total of five functional interfaces may be displayed in a virtual porthole. If, for example, the control point is a limited-size (or compact or handheld) device (e.g., a smart phone or portable media player) with a small display screen size (e.g., 4 to 12 centimeters (cm)×4 to 8 cm) or 10 to 30 cm diagonal), a total of two functional interfaces may be displayed in the virtual porthole due to the relatively smaller display screen available thereon.

FIG. 3A through FIG. 3D illustrate a control point device screen P250 to display a virtual porthole 210 described above in accordance with one embodiment on a screen of a media player (e.g., the wireless media player 173 of FIG. 1). During initialization (e.g., when a control point device is turned on), control server forwards to the control point a number of functional interfaces 200 to be displayed within a virtual porthole P210 rendered on a display screen of the control point P250 and the preferred number of relevant items to be displayed based functional interfaces. The control point device screen P250, illustrated in FIG. 3A, includes a static area P201 and an area for displaying a virtual porthole P210. The virtual porthole P210 is used for a user to view the status of one or more functional interfaces 200 on the screen of the wireless media player 173. In another embodiment, the entire control point device screen P250 is used to display the virtual porthole P210 on the screen of the wireless media player 173.

Figure 3B:
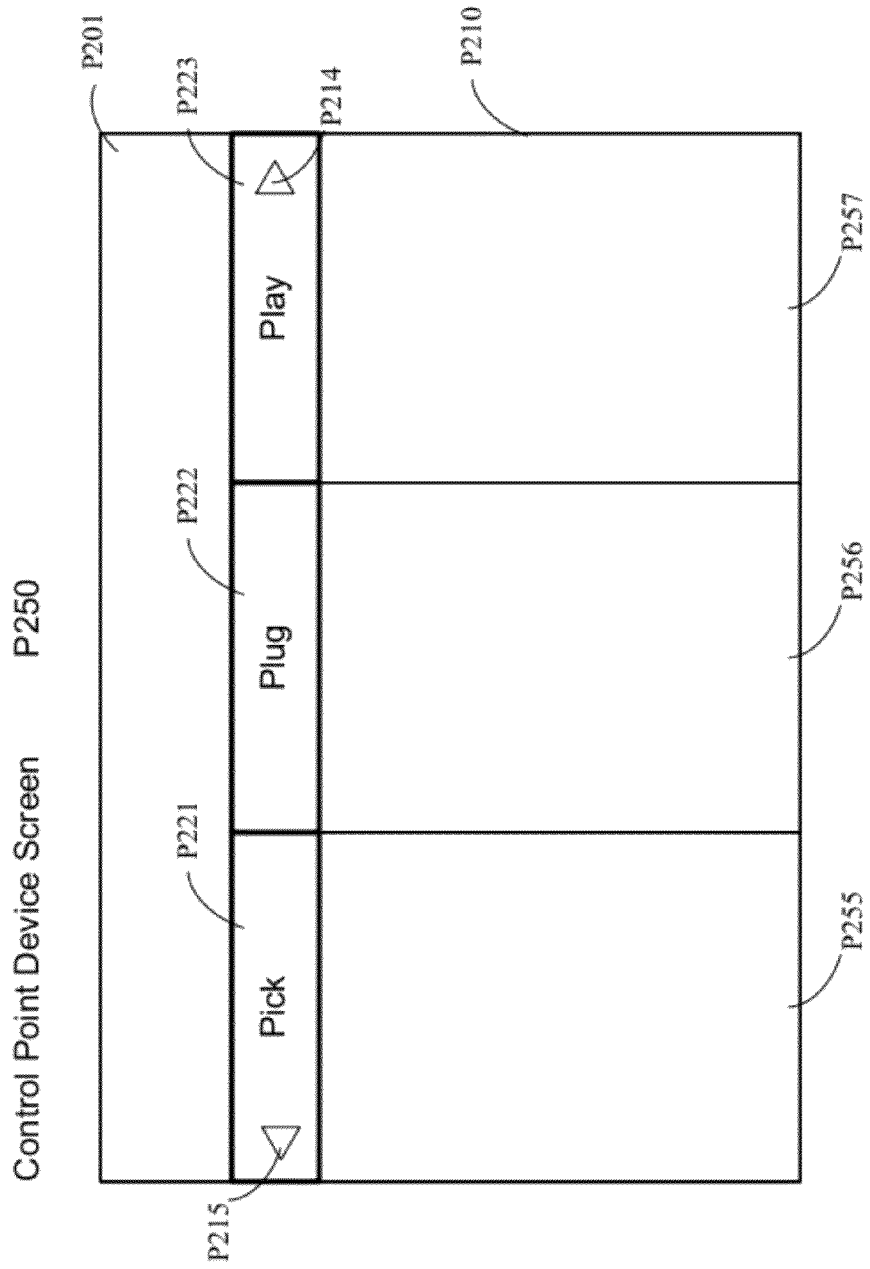
FIG. 3B through FIG. 3D illustrates exemplary graphical user interface implementations of a control point porthole for user interaction with the exemplary user interfaces, in accordance with one embodiment.

FIG. 3B illustrates a control point device screen P250 with a virtual porthole P210 that displays Pick P255, Plug P256 and Play P257 functional interfaces on the screen of the wireless media player 173. The virtual pothole P210 displays headers P221, P222 and P223 presenting the relevant functional interfaces names for user convenience. In other embodiments, the interface headers may not be displayed. A user may also interact with input options provided by the control point to navigate from one subset of functional interfaces to another subset. For example, a user may navigate by interacting with input options provided on the control point device screen P250, to a first direction P214, or to a second direction P215 as in FIG. 3B. Advantageously, a predefined navigation configuration and order that simplifies navigation in different directions may be provided.

Figure 3C:
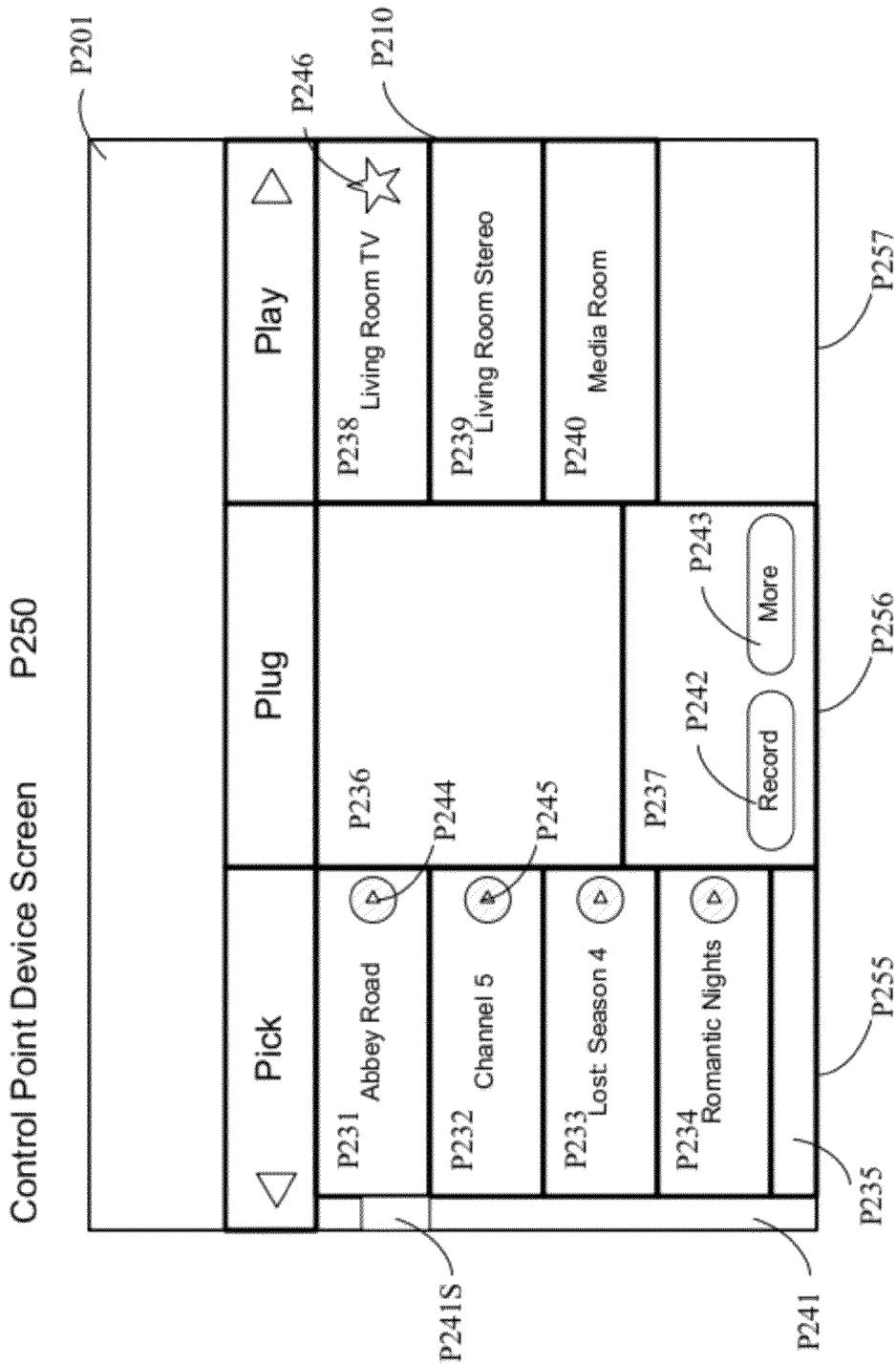
Figure 3D:
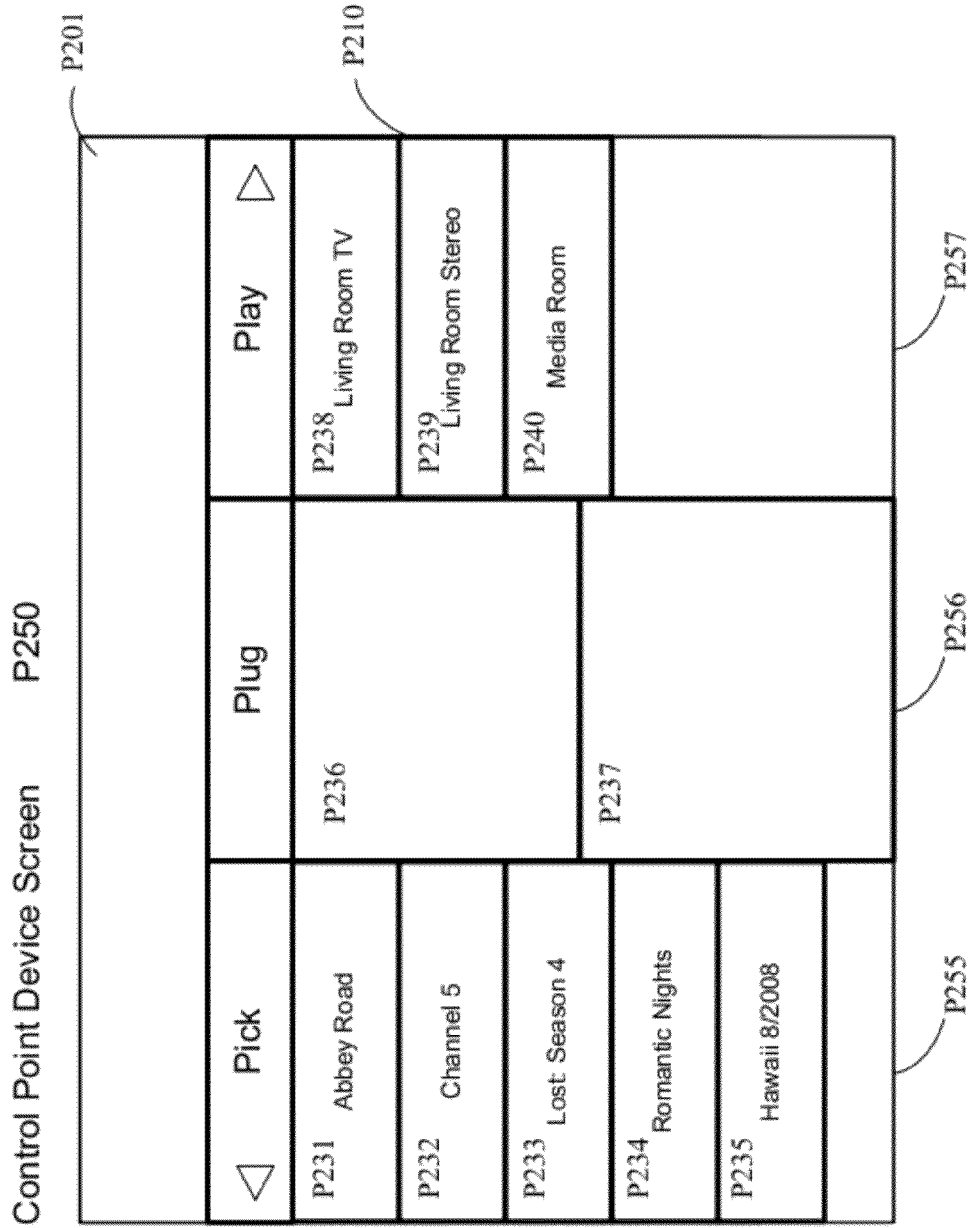

The number of functional interfaces viewed through a virtual porthole and the number of relevant media content items to be displayed within a functional interface is a design choice. FIG. 3B and FIG. 3D display a control point device screen P250 with same three functional interfaces Pick P255, Plug P256 and Play P257, but with different numbers of relevant content items in Pick P255 interface. Specifically, the Pick interface P255 in FIG. 3C includes four items: Abbey Road P231, Channel 5 P232, Lost: Season 4 P233, Romantic Nights P234. Due to larger display screen size than the one in FIG. 3C, the Pick interface P255 in FIG. 3D includes 5 items: the four items of FIG. 3C and an additional item, Hawaii 8/2008 P235. To compensate the smaller display screen illustrated in FIG. 3C, the control point device screen P250 also includes a slide bar P241 with a slider P241S. In another implementation a media content item of a functional interface may be presented differently on different screen sizes, for example, the Plug interface 256, second item P237 in FIG. 3C includes two buttons record P242 and more P243, while the same item from the same Plug interface P256 in FIG. 3D is represented as a pure text.

In one implementation, icons may be included in order to represent functional interfaces items. Icons may include playback device icons from the device manufacture, user selected from a list, a logo representing a TV channel, a picture thumbnail or any other graphic representation of an item. For example, as illustrated in FIG. 3C, the Living room TV P238 has an icon P246 and the items Abbey Road P231 and Channel 5 P232 each has its respective icon P244 and P245. In other implementations functional interfaces items may be presented by text only, for example Media Room P240 in FIG. 3C and FIG. 3D, or a combination.

In different embodiments, the disclosed configuration may be implemented either entirely in the form of hardware or entirely in the form of software, or a combination of both hardware and software elements. For example, control points and control servers implementing virtual porthole and functional interfaces may be presented largely in terms of hardware components and software code executed to perform processes that achieve the results contemplated by the system disclosed herein.

Referring back to FIG. 1, the network environment 150 comprises a hardware environment and a software environment. The hardware environment comprises the machinery and equipments that provide an execution environment for the software to implement the disclosed configuration. The software provides the execution instructions for the hardware as provided below. As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Figure 6:
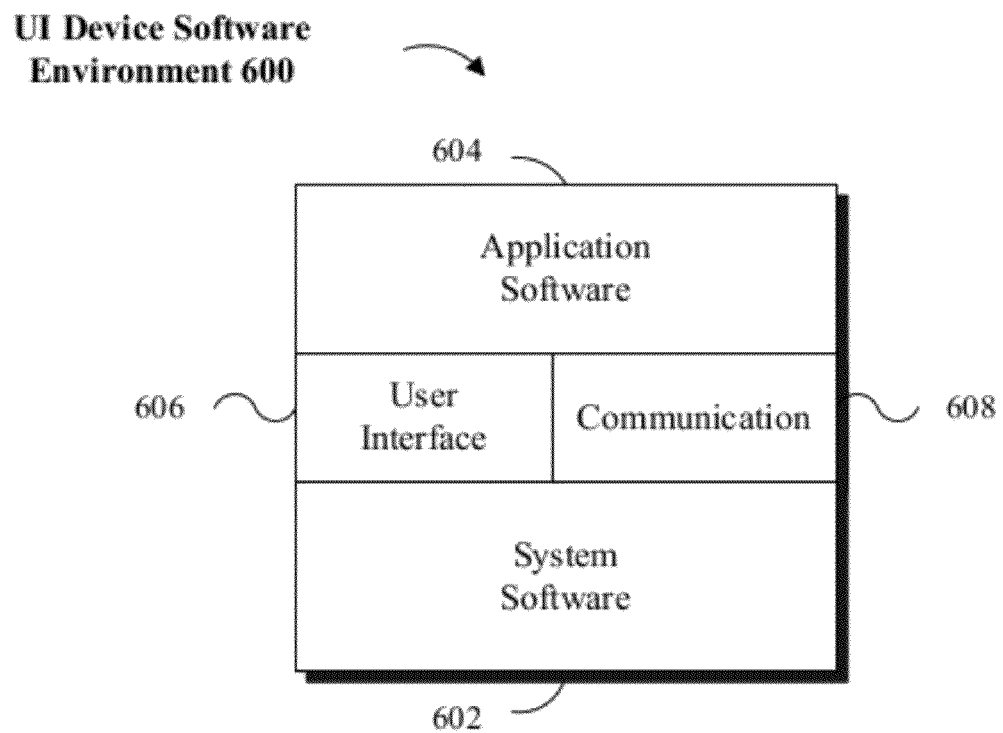
FIG. 6 is a block diagram of a software environment in which a system of the present invention operates, in accordance with one embodiment.

The software environment is further illustrated in FIG. 6. Software environment 600 is divided into two major classes comprising system software 602 and application software 604. The system software 602 comprises control programs, such as the operating system (OS) and information management systems that instruct the hardware how to function and process information.

In one embodiment, a virtual porthole (e.g., the virtual porthole 210 in FIG. 2) and functional interfaces 200 may be implemented on the same hardware, e.g. laptop PC 171, by the system software 602 or the application software 604 and executed in one or more hardware environments. In an alternate embodiment, the virtual porthole is implemented on one device and by the system software 602 or the application software 604 and executed in one hardware environment, e.g., a mobile phone 165, and the functional interfaces 200 is implemented in a different hardware environment computer, e.g. PC 183, by the system software 602 or the application software 604. The application software 604 may comprise but is not limited to, program code, data structures, firmware, resident software, microcode or any other form of instructions, information or routine that may be read, analyzed or executed by a processor or microcontroller.

In an alternative embodiment, the disclosed configuration can be implemented as computer program product accessible from a computer-usable or computer-readable medium providing program code for use by or in connection with a computer or any instruction execution system. For the purposes of this description, a computer-usable or computer-readable storage medium can be any apparatus that can contain, store, communicate, propagate or transport the program for use by or in connection with the instruction execution system, apparatus or device.

The computer-readable storage medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Figure 5:
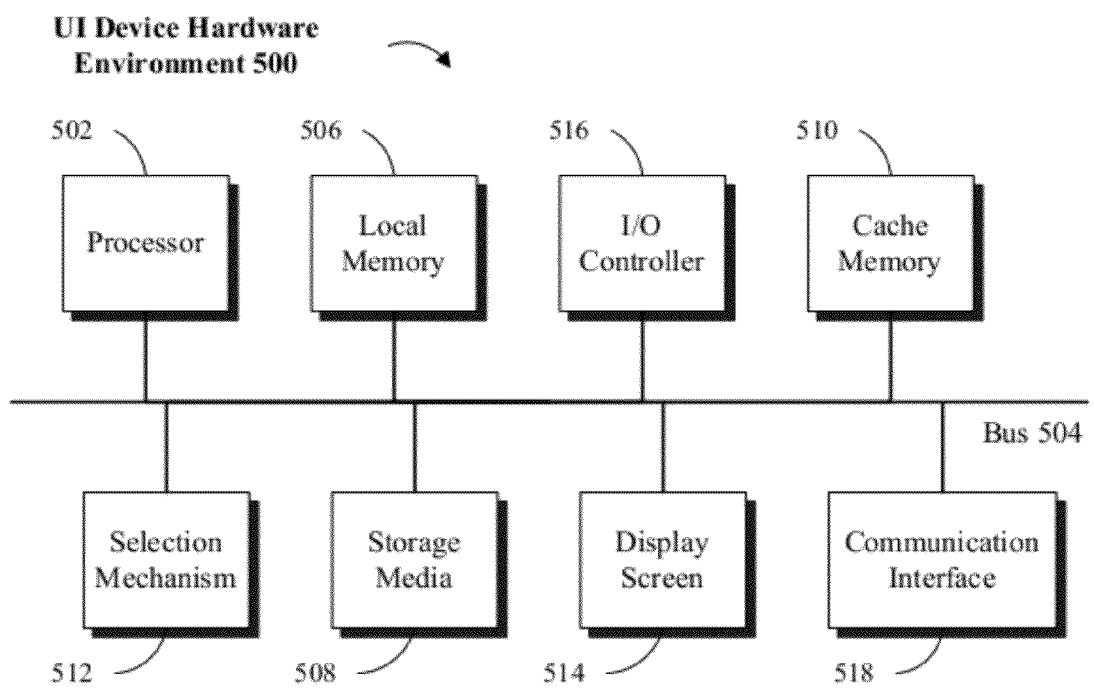
FIG. 5 is a block diagram of a hardware environment in which a system of the present invention operates, in accordance with one embodiment.

FIG. 5 illustrates one embodiment of a hardware environment. An embodiment of the system software 602 and application software 604 may be implemented as computer software in the form of computer readable code executed on a data processing system such as hardware environment 500 that comprises a processor 502 coupled to one or more computer readable media or memory elements by way of a system bus 504. The computer readable storage media or the memory elements, for example, may comprise a local memory 506, a storage media 508, and/or a cache memory 510. The processor 502 loads executable code from storage media 508 to local memory 506. The cache memory 510 provides temporary storage to reduce the number of times code is loaded from the storage media 508 for execution.

A user selection device 512 (e.g., keyboard, pointing device, touch screen, etc.) and a display screen 514 may be coupled to the computing system, for example, either directly or through an intervening I/O controller 516. A communication interface unit 518, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, the hardware environment 500 may not include all the above components, or may comprise other components for additional functionality or utility. For example, the hardware environment 500 may be a laptop computer or other portable computing device embodied in an embedded system, for example, a personal digital assistant (PDA), a mobile internet device (MID), a mobile communication unit (e.g., a wireless phone), or other similar hardware platforms that have information processing and/or data storage and communication capabilities.

In certain embodiments of the system, the communication interface 518 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to Figure (or FIGS.) 1, 2A, 5, and 6, the system software 602 and the application software 604 may comprise one or more computer programs that are executed on top of an operating system after being loaded from the storage media 508 into the local memory 506. In a client-server architecture, the application software 604 may comprise client software to implement a control point and server software to implement a control server. The control server in one embodiment is local to the control point, for example, in the same physical device. In another embodiment, the control server may be remote to the control point such that the configuration includes two or more separate physical devices.

The software environment 600 may also comprise communication software 608 for accessing data available over local or remote computing networks (e.g., network environment 150). Further, the software environment 600 may comprise a GUI 606 (e.g., virtual porthole P210) for receiving user requests and data. Please note that the hardware and software architectures and environments described above are for purposes of example, and one or more embodiments may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

A user may interact with input options provided by the control point to perform operations associated with functional interfaces 200. Selection operations may be performed by way of user interaction with a single functional interface to select, add, modify, remove, or change the order of items in the single functional interface. For example, a user can interact with a source interface comprising media servers and sources (e.g., Netflix, abc.com, Comcast, and iTunes) to select sources from which to retrieve media content.

Media sources are items associated with media devices, or with local/remote media libraries or with remote services such as the Internet or a satellite head-end in the network environment 150. For example, a cable or satellite broadcasting service (e.g., Comcast, or Dish Network) may be associated with the STB/DVR 159 and a media serving service (e.g., Apple iTunes) may be associated with the wireless media player 173. In one embodiment, a user may use Source interface to select from one or more local or remote sources. Search interface may be used to search for content based on search criteria defined by one or more search filters and selected media sources. A user may view a list of search results and select content for a later use, using Media interface.

A user interacts with a plurality of functional interfaces to establish a logical relationship among two or more functional interfaces. Examples of user interactions include: adding one or more items from one interface to another interface; adding one or more items from one interface to one or more items on another interface; connecting one or more items from one interface to another interface; and connecting one or more items from one interface to one or more items on another interface.

Generally, control point logic implemented in a control point collects requests from a user. A user request represents one or more user interactions with the functional interfaces. A user request can be a simple command requesting the control server to perform a requested action. For example, a user may transmit a request to the control server to search for particular media content from a content provider. A user also can transmit a request that represents a sequence of user interactions with the functional interfaces. For example, a user may transmit a request that includes a selection of the place to play a selected media content and a command that requests the control server to discover other playback devices, e.g., Lost: Season 4 (P233) to be played on Living Room TV (P238) in FIG. 4C. Exemplary user requests further include navigation requests that changes the functional interfaces displayed in a virtual porthole after user moving the porthole in a first or a second direction in a linear functional interfaces predefined arrangement. The user requests also include activating one or more functional interfaces on the server side, that reflect the data to be displayed on the display screen of the connected control point devices.

The control point logic sends the user requests along with operation parameters (e.g., user authentication data, display size and resolution and etc.) to a control server for processing. In one embodiment, the control point logic immediately sends (or transmits) a user request to the control server. Other embodiments allow the control point to accumulate user requests and aggregate multiple user requests into an aggregated user request. The control point sends the aggregated user request to the control server for further processing. Once the control point device receives the requested data, e.g., one or more functional interfaces, the control point displays the relevant set of functional interfaces in the virtual porthole and provides one or more input options to a user for interacting with the virtual porthole.

In one embodiment, during initialization (e.g., when a control point is turned on), the control point establishes a connection with the control server and forwards to the control server its size, and resolution, among other parameters for the number of functional interfaces 200 to be displayed within a virtual porthole rendered on a display screen of the control point.

In another embodiment, the control point may also forward to a control server a user identifier uniquely identifying a user or a category of users. Accordingly, a customized set of functional interfaces associated with the particular user identifier may be displayed in the virtual porthole. The user identifier may indicate that the user of the control point is a novice user, an advanced user, an under-aged user, or other type of user, so that certain functionalities or operations are enabled or disabled in the functional interfaces 200. The user identifier may be also used to provide for some of the functional interfaces, custom options or menus to a user based on prior user settings or preferences.

Turning now to FIG. 7, FIG. 7 illustrates a process of a user interacting with a plurality of functional interfaces to establish a logic relationship among two or more functional interfaces via a control server. Initially, a control point used by the user collects 702 system and basic data necessary for communication with the server. The system and basic data include user authentication data, display size and resolution, processing capabilities (e.g., CPU power and memory size, etc.) of the control point and etc. The control point initializes 704 the server communication channel, and sends 706 the authentication data along with the screen size and resolution and operation parameters to the control server.

Following the initialization, the control point receives 708 "authentication successful" flag from the control server along with a list of pointers to the available functional interfaces to be displayed in a virtual porthole. The control point requests 710 the data for the set of the functional interfaces from the control server relevant to the display. The control point receives 712 from the control server the requested data and populates the virtual porthole. The control point waits 714 for a user interaction with a display device. In response to the user navigating 716 the porthole to a side of the adjacent functional interfaces, the control point requests 710 the data of the adjacent functional interfaces from the control server. In response to the user performing 718 local operations (e.g., selecting a media content item), the control point collects 722 the operation locally to a sequence of operations and requests 710 the data from the control server for the local operation. In response to the user changing basic data (e.g., user identification) or finishing a sequence of operations on a subset of the functional interfaces, the control point determines 724 whether the next operation is "exit" request from the user. If it is an "exit" operation, the control point ends 726 the operation; otherwise, the control point sends 706 authentication data to the control server and processes through the receiving of the flag 708 to the end 726.

A control server detects that a user intends to perform an action by monitoring user interaction with the control point, or being notified by the control point of a desired user action. The control server performs the requested logic for each relevant functional interface and updates information stored for one or more functional interfaces, and forwards update information to the control point device, in response to user interaction. Specifically, upon collecting the basic information and assembling the set of functional interfaces, for each control point device, a control server forwards information to be included in the set of functional interfaces to be displayed on the control point device virtual porthole. The information may be managed and stored in a storage device on the same device as the control server or in a separate storage device remotely accessible by the storage server.

Figure 8A:
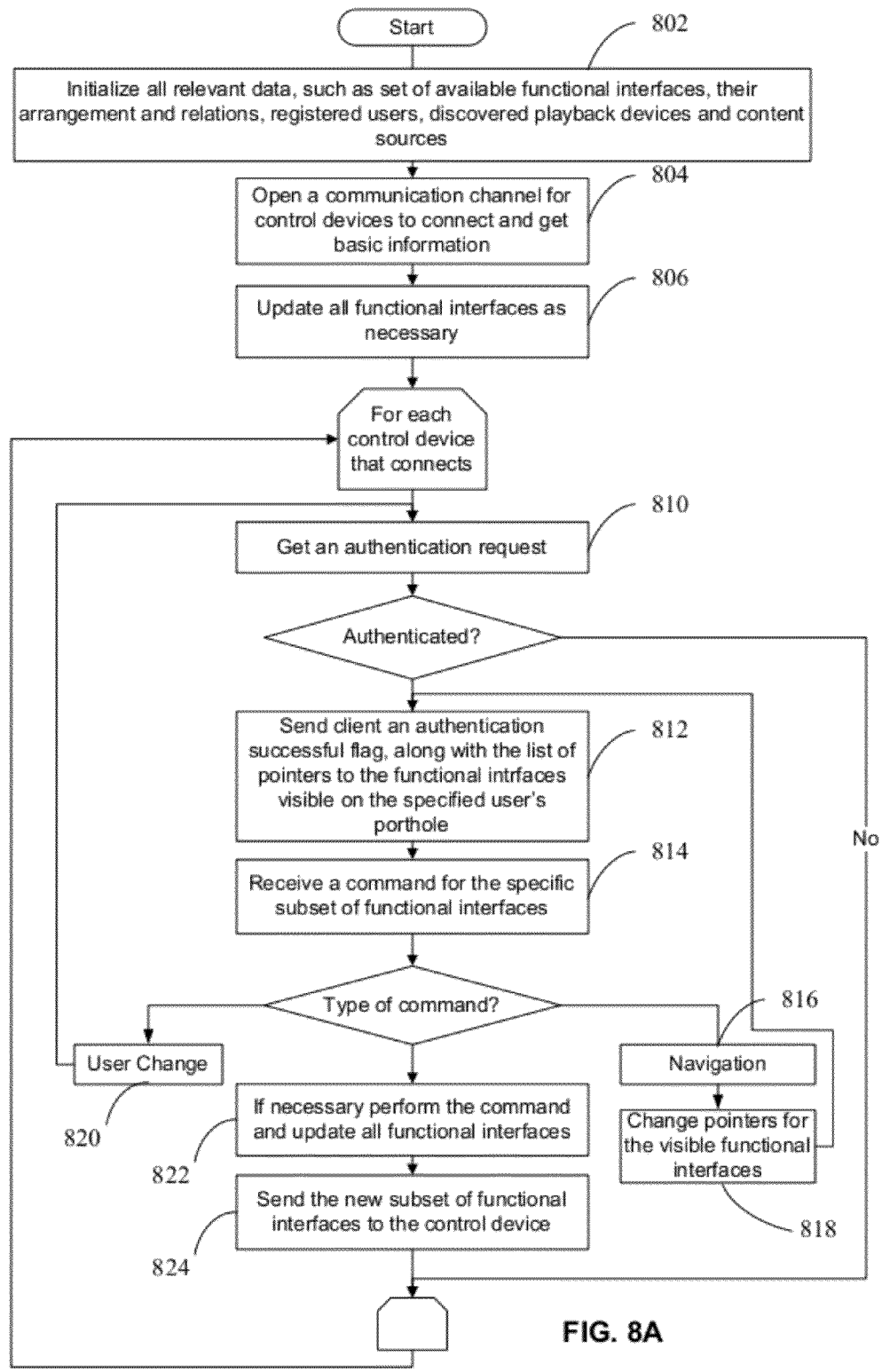
FIG. 8A is a process of a control server to respond to user requests, in accordance with one embodiment.

FIG. 8A illustrates a process of a control server to respond to a user request in accordance with one embodiment. Initially, the control server initializes 802 all relevant data, such as set of available functional interfaces, the arrangement and relations among the interfaces, discovered playback devices and media content. In response to a communication request from a control point, the media server opens 804 a communication channel for the control point/device and gets the basic information (e.g., user authentication data, display size and resolution of the screen of the control device, etc) from the control point. The control server updates 806 the functional interfaces as necessary after initialization. For each control device that connects to the control server, the control server gets 810 an authentication request from the control device. If authentication is successful, the control server sends 812 the client (e.g., the control device) an "authentication successful" flag along with a list of pointers to the functional interfaces visible on the specified user's porthole. The control server receives 814 a request for the specific subset of functional interfaces. In response to user identification change 820, the control server gets 810 the authentication request and performs the steps after authentication (e.g., steps 812-814). In response to a user navigation request 816, the control server changes 818 pointers for the visible functional interfaces being displayed on the user's porthole and performs the steps of 812-814. The control server also performs 822 the other user requests and updates the functional interfaces. In one embodiment, the control server sends 824 the new subset of functional interfaces to the control device. Exemplary user requests processing are further explained in conjunction with the descriptions of FIG. 8B-8D.

Figure 8B:
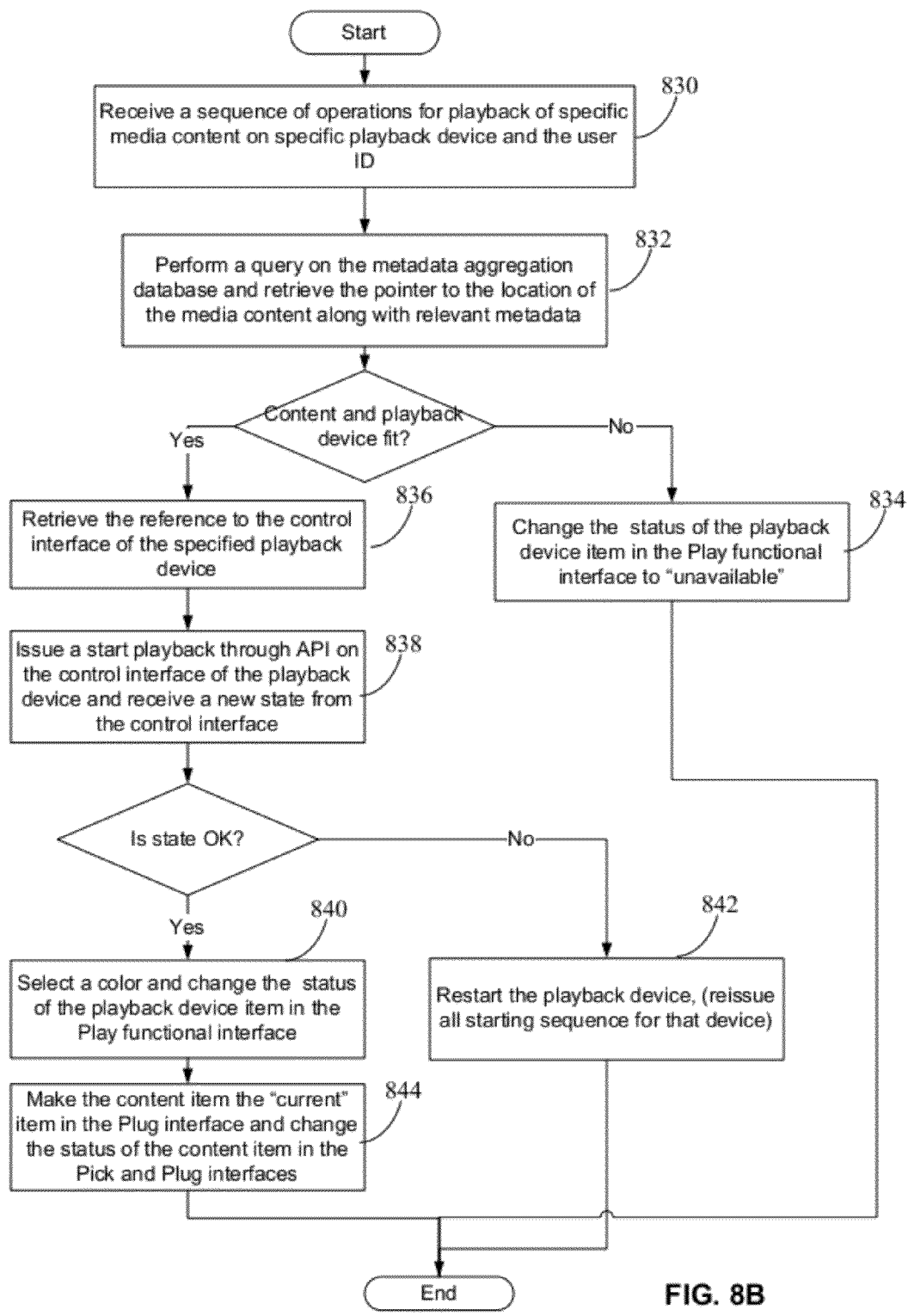
FIG. 8B is a process of a control server to respond to a user navigation request, in accordance with one embodiment.

FIG. 8B illustrates a process of a control server in response to a user navigation request in accordance with one embodiment. Initially, the control server receives 830 a sequence of operations for a user request to start playback of particular media content on a particular playback device associated with a user identification. The control server performs 832 a query on a metadata aggregation database and retrieves the pointer to the location of the media content along with relevant metadata (e.g., location of media content, ownership of the media content, etc). The control server checks whether the content fits the playback device (e.g., device compatibility for a H.264 video stream). If the content does not fit the playback device, the control server changes 834 the status of the playback device item in Play functional interface to "unavailable". Otherwise, the control server retrieves 836 the reference to the control interface of the specified playback device. In an alternate embodiment, the control server may try to execute a 'transcoding" logic that translates the content format to fit the playback device. The control server issues 838 a start playback response through an application programming interface (API) on the control interface of the playback device and receives a new state information form the control interface (e.g., "in play"). In response to the state is ok (i.e., the playback device can be successfully started), the control server selects 840 a color and changes the status of the playback device item in Play functional interface. The control server further makes 844 the content item the "current" item in Plug interface and changes the status of the content item in Pick and Plug interfaces. In response to the state is not ok, the control server restarts 842 the playback device, e.g., reissue all starting sequence for the device.

Figure 8C:
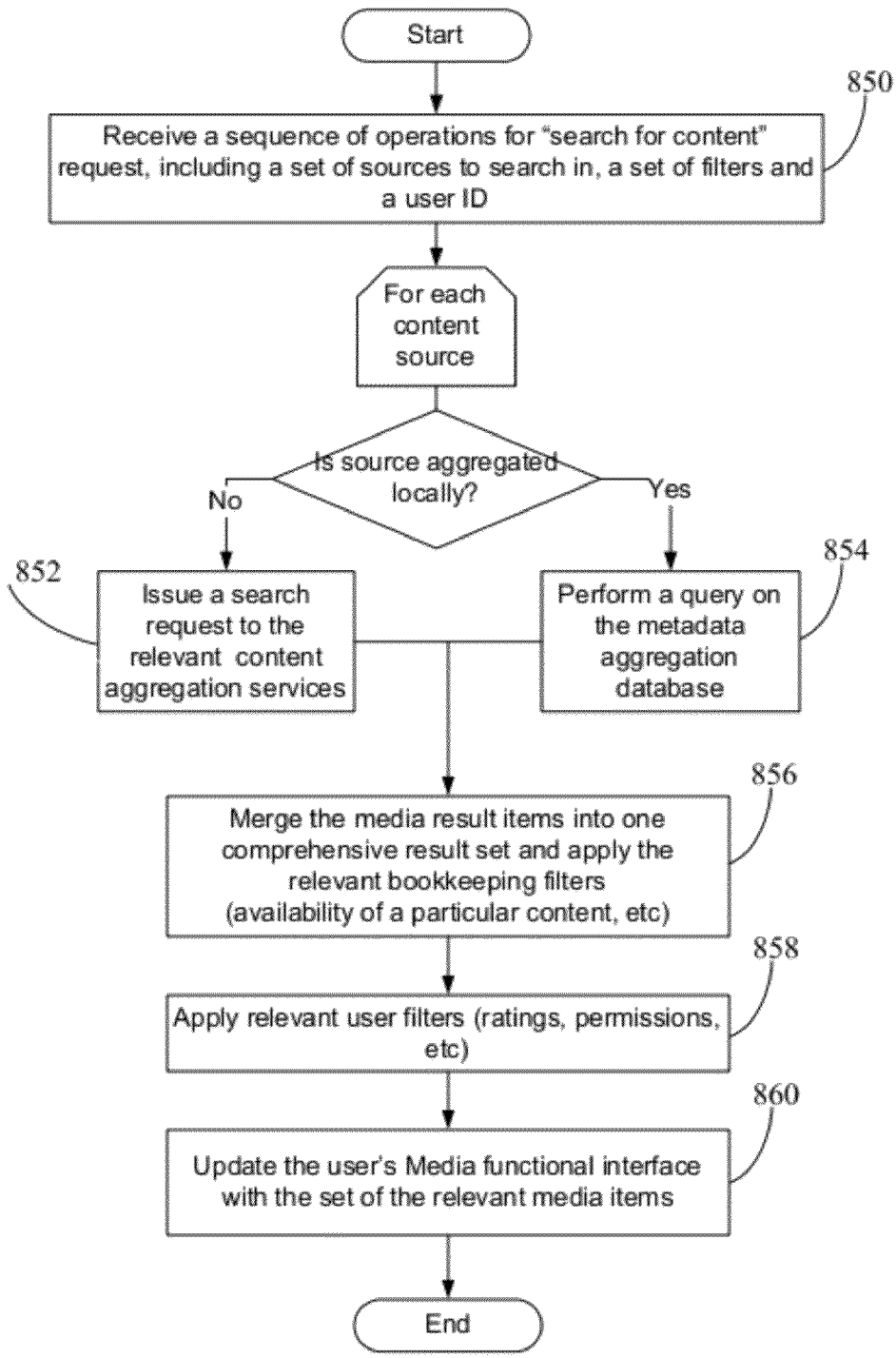
FIG. 8C is a process of a control server to respond to a user search for media content request, in accordance with one embodiment.

FIG. 8C illustrates a process of a control server in response to a user search for media content request in accordance with one embodiment. Initially, the control server receives 850 a sequence of operations for "search for content" request. The requested content may be the audiovisual data of a movie, TV show, or Internet search result, etc. The request includes a set of sources to search in, a set of search filters and a user identification. For each content source, the control server checks whether the source is aggregated locally. In response to local storage, the control server performs 845 a query on the metadata stored database. In response to non-local storage, the control server issues 852 a search request to the relevant content aggregation services. The control server merges 856 the media content search result into a comprehensive result set and applies the relevant bookkeeping filtering for availability of particular media content. The control server further applies 858 relevant user filters (such as ratings, permissions, etc.) to the media content search result, and updates 860 the user's Media functional interface with the set of the relevant media content items.

Figure 4A:
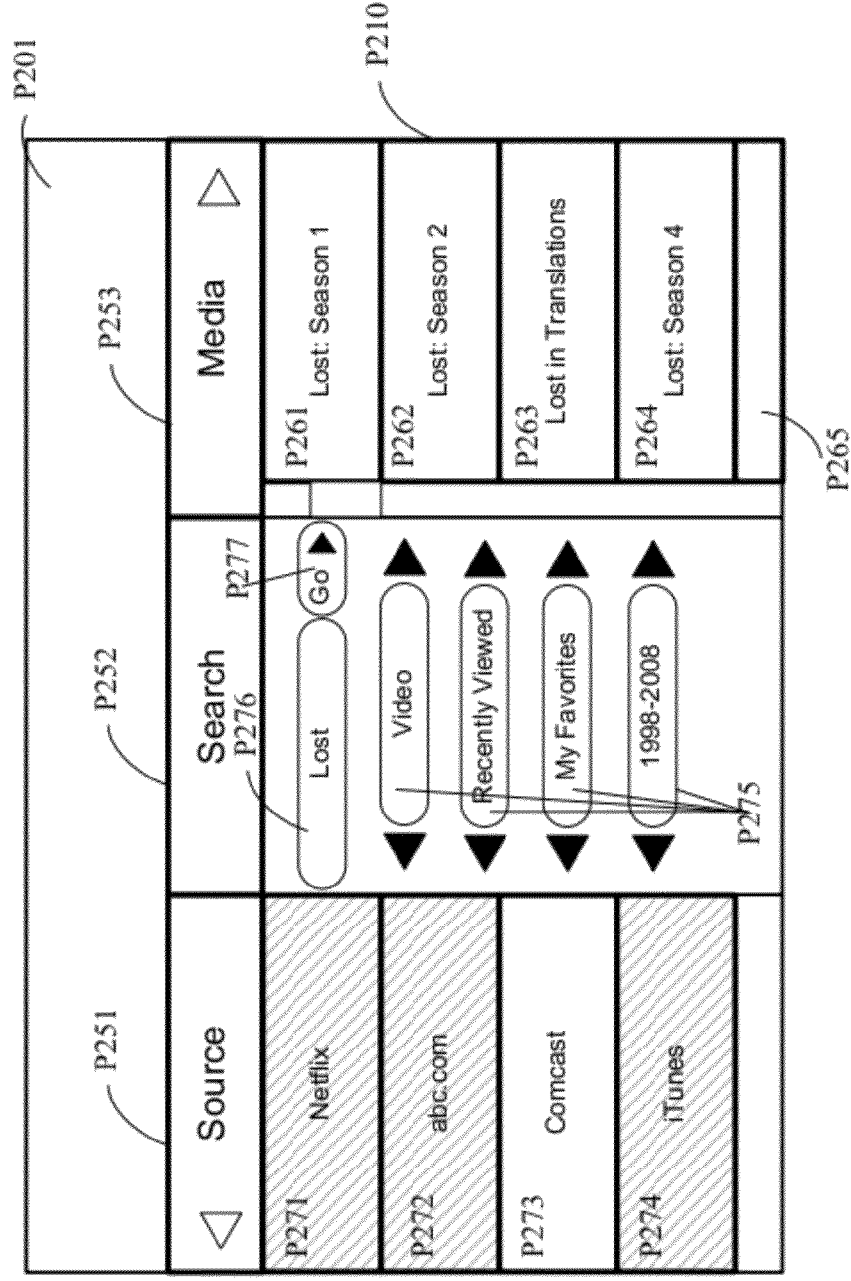
FIGS. 4A through 4D illustrate exemplary graphical user interfaces of a control point porthole after user interaction with functional interfaces via a control server, in accordance with one embodiment.
Figure 4B:
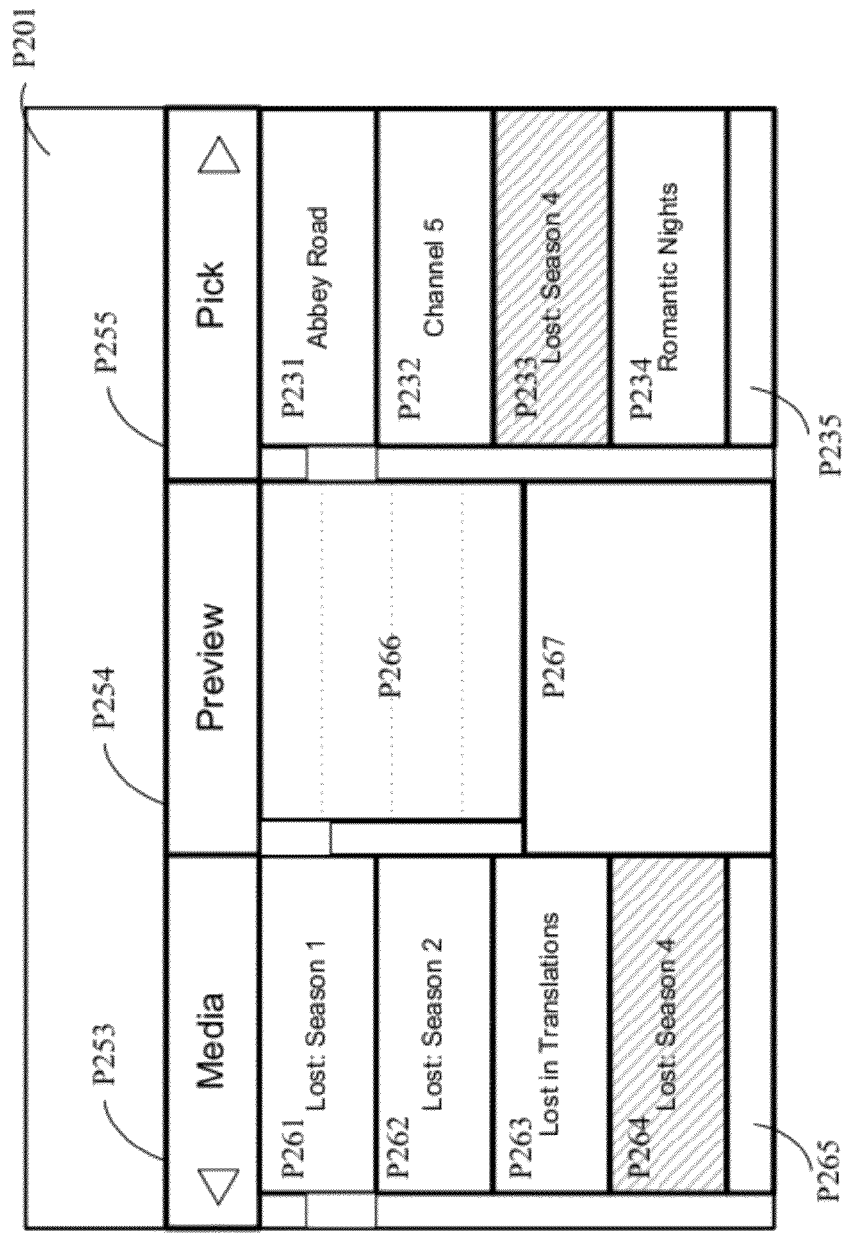
Figure 4C:
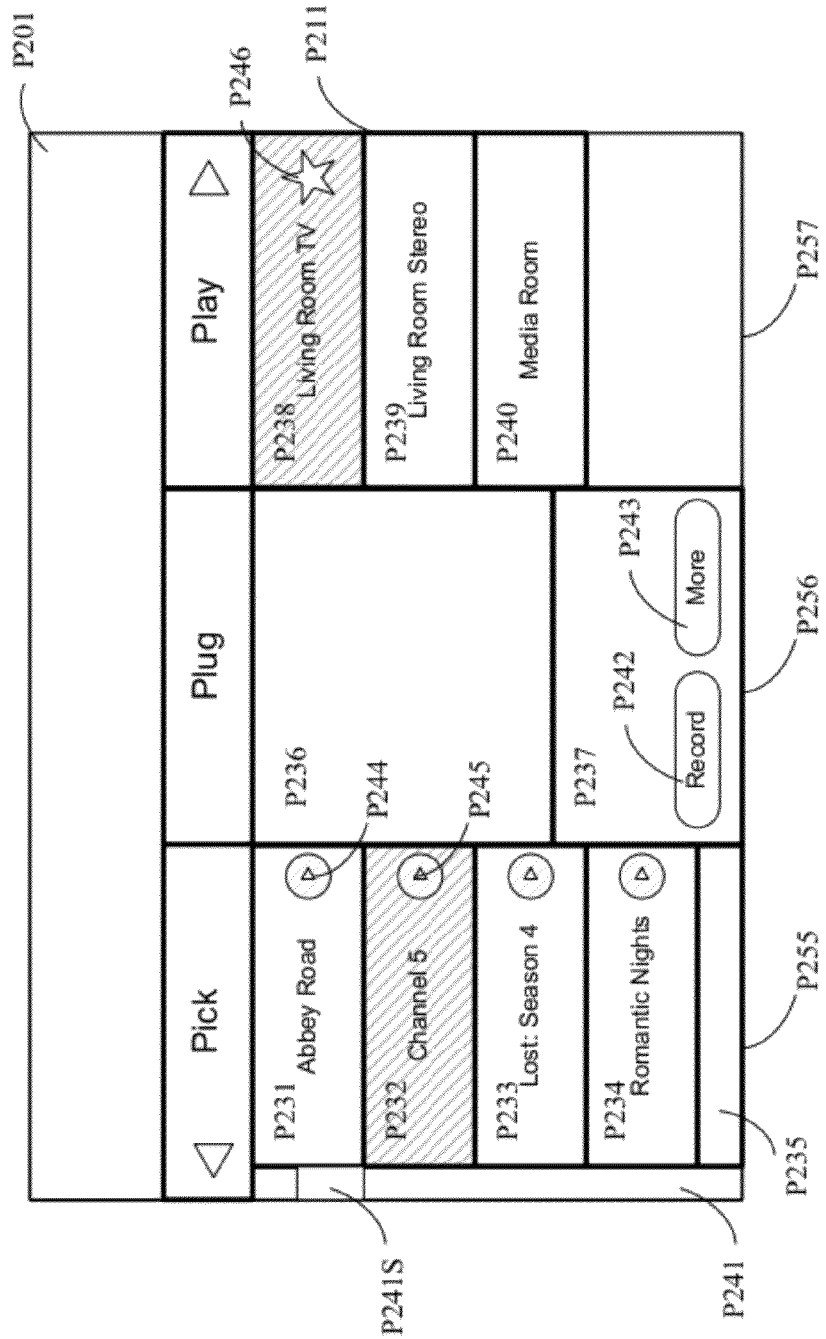

To further explain user interactions with a plurality of functional interfaces to establish a logic relationship among two or more functional interfaces via a control server illustrated in FIG. 7, FIG. 8A, FIG. 8B and FIG. 8C, exemplary processing results of the user interactions are presented with FIG. 4A, FIG. 4B and FIG. 4C. For ease of discussion, the wireless media player 173 FIG. 1 is used to illustrate the control point device and the media server 177 of FIG. 1 functions as the control server described in FIG. 8A-8C. The screen of the wireless media player 173 illustrates the virtual porthole described in FIG. 4A-4C.

FIG. 4A illustrates a virtual porthole that displays Source P251, Search P252 and Media P253 functional interfaces after user interactions. In FIG. 4A, for example, a relationship is established among Netflix P271, abc.com P272 and iTunes P274 in Source interface P251 (i.e., the shaded blocks of P271, P272 and P274) and Search interface P252 by way of a user selecting the related icons for each item. Once the relationship is established, a user may use the search filter by selecting, for example, the "Go" button P277 to search sources Netflix P271, abc.com P272 and iTunes P274 for a particular content. For example, the user may enter the word "Lost" in a text box P276 that includes the word "Lost" in its title to retrieve videos from a media server (e.g., the media server 177 of FIG. 1). As shown, the search results may be displayed in Media interface by, for example, displaying the title of the videos that meet the search criteria. The user may then select content from Media interface, preview it in the preview functional interface P254, Move it to Pick functional interface for a later view and then later assign it to a media playback device in network environment 150 for playback.

In response to a user request, the control point device logic sends the user request along with necessary data (e.g., user authentication data) to the control server for further processing. For example, if a user selects the sources: Netflix P271, abc.com P272 and iTunes P274 from Media sources functional interface "Source" P251 to search for videos including the word "Lost" P276 with other search filters P275 and selects the "Go" button P277, the control point device logic sends the control server the a user request comprising the sequence of above operations and pointers to Source functional interface P251 and Search interface P252. Upon receiving the information, the control server searches the media sources (e.g., laptop PC 171, Internet 125) as further described in one optional implementation in FIG. 8D, in local content metadata databases and in remote content services for video content including the word "lost" in the title. Once the search is completed, the control server updates information stored for Media functional interface with the search results and forwards updates for all three functional interfaces to the control point device porthole Service P251, Search P252 and Media P253.

FIG. 4B illustrates a virtual porthole that displays Media P253, Preview P254 and Pick P255 functional interfaces after user interactions. In response to a user navigation action to move the virtual porthole 210, the control point device receives information to be included within a new subset of functional interfaces from the control server, such as the top 4 content items in the Pick functional interface P255. The control point device then displays these functional interfaces in the virtual porthole 210 using the respective information. The user can select a content item from Media functional interface, such as "Lost Season 4" P264 for preview (i.e., the shaded block P264). Once selected, the control point device logic sends the control server logic, the request and pointers to Media functional interface P253 and Preview interface P254. Upon receiving the information, the control server allocates the information for that content, (e.g. a pointer to a preview video and other textual metadata), updates information for the user stored in Preview functional interface P254 and forwards updates for Preview functional interface to the control point device porthole. The control point logic receives this information to display for example, the list of episodes in area P266 and the metadata information in area p267, both representing information stored in Preview functional interface. The user can select the content of the whole season and drag it into Pick functional interface P255 for a later use (i.e., the shaded block P233). In this case, the control device logic sends the request and the set of the two functional interfaces, Preview and Pick, to the control server. The control server updates Pick functional interface and returns an update to the control point logic.

As described above, if the user performs a navigation-related action, the virtual porthole is moved in a first direction according to a predefined configuration of the functional interfaces 200. If the functional interfaces 200 are arranged in a linear arrangement, the virtual porthole may be moved in first and second directions (e.g., to the left or to the right using navigation buttons P214, P215). For example, if the user navigates to the right in the linear arrangement, the virtual porthole on the control point device screen presents functional interfaces Media P253, Preview P254 and Pick P255, instead of Source P251, Search P252 and Media P253.

In some cases, a user action performed using the set of functional interfaces may automatically cause the virtual porthole to be moved in a certain direction. For example, in a virtual porthole that can display only one functional interface, if a user selects content from one functional interface, the control point may cause the virtual porthole to automatically provide a preview of the content by another functional interface in the virtual porthole.

FIG. 4C illustrates a virtual porthole that displays Pick, Plug and Play functional interfaces after user interactions. The Pick interface may be populated, for example, by way of a user dragging and dropping a title from Media or Preview functional interfaces as described before. Pick interface may alternatively be populated by way of automatic updates of available content on the server side and provide a list of content items available from different sources, such as recommendations from friends, available broadcast channels, etc. for a later use. A user may select media content (e.g., the shaded block "Channel 5") from Pick interface by interacting with the virtual porthole through user input options provided by the control point.

The user may connect or establish a logical relationship between the selected media (e.g., Channel 5) from Pick interface and Plug interface by, for example, selecting that content item, by pressing that media item associated button P245, by selecting an icon associated with the selected content, by way of a drag and drop action, or other interactive means. Once the desired relationship or connection is established between content in Pick interface and Plug interface, Plug interface may display the content in a media display area (e.g., window P236) of Plug functional interface of the virtual porthole.

In some embodiments, the user may, for example, select Channel 5 from Pick interface and either preview it in the display area of the Plug interface, or connect the selected content directly (e.g. for convenience) to a particular media device (e.g., the shaded block "Living Room TV" P238) in the network environment 150 to cause the selected media player to play the episode on the selected media device. For example, when "dragged" directly into Play functional interface, the control point device logic sends the control server a sequence of operations in form of a user request as if the user selected the content item P232 for preview in Plug functional interface and immediately selected for viewing on the Living room TV P238. The control server, in one implementation, checks the content and the playback device for compatibility and starts a playback operation on the playback device if it is compatible, updates Plug functional interface with the content, and displays status change information in Play interface.

In some embodiments, if the selected media (e.g., Channel 5) is subdivided into several sub-contents (e.g., "Lost Season 4" may have 18 recorded episodes), the Plug interface may display a list of the sub-content for user selection in the display area P236. The user may, for example, select Episode 01 from Plug interface and preview it in the same display area, or connect the selected episode to a particular media device (e.g., the Living Room TV P238) in the network environment 150 to cause the selected media player to play the episode on the selected media device. Plug interface may also be implemented to provide additional options P237 (e.g., "Record" button P242 and "More" button P243) for viewing even more information or, for example, recording a content being played.

As illustrated in FIG. 4C, additional information about a selected content may be presented in the Plug functional interface in the form of an option list o that provides a user with one or more options to learn about the production of the content, demographics of the viewers, or even purchasing related items over the Internet. Accordingly, depending on implementation, Plug interface may provide lists and sub-lists for a variety of possible options and sub-menus for a user in relation to media content selected from Pick interface.

Figure 8D:
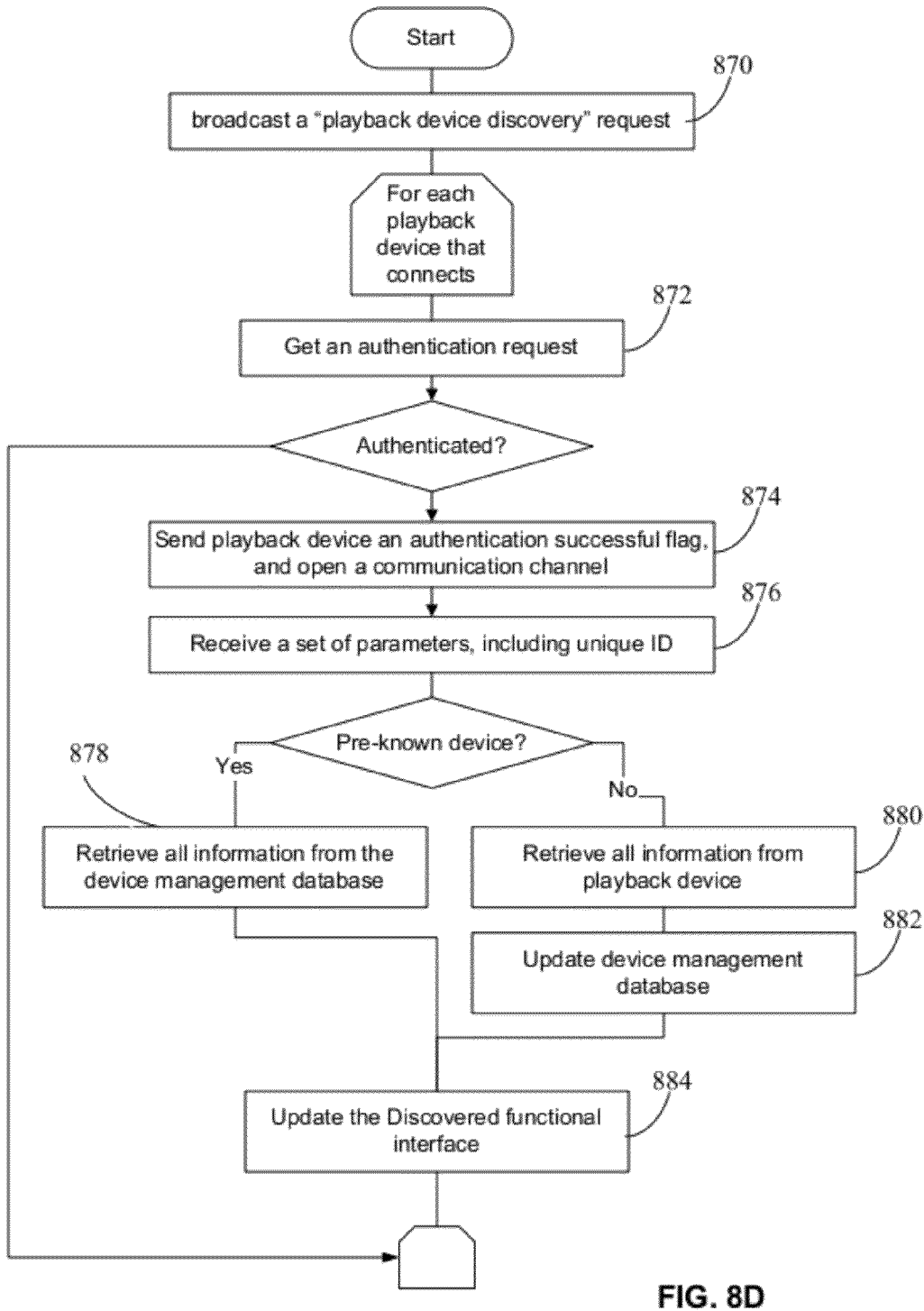
FIG. 8D is a process of a control server to respond to a user playback device discovery request, in accordance with one embodiment.

Referring now to FIG. 8D, FIG. 8D illustrates a process of a control server in response to a user playback device discovery request in accordance with one embodiment. Other embodiments perform different and/or additional steps than the ones described here. For example, the control server may automatically perform playback device discovery periodically without a user request. Moreover, other embodiments perform the steps in different orders.

Initially, the control server receives a "playback device discovery" request and broadcasts 870 the request to all playback devices in the network environment 150. For each playback device that the control server connects, the control server gets 872 an authentication request and performs authentication on the playback device. If the authentication is successfully performed, the control server sends 874 the authenticated playback device an "authentication successful" flag and opens a communication channel with the playback device. The control server receives 876 from the playback device a set of parameters including unique identification of the playback device. If the playback device is a pre-known device (e.g., has already registered with the system), the control server retrieves 878 all information from a device management database about the playback device. In response to the playback device is a newly discovered device, the control server retrieves 880 all information from the playback device itself (e.g., the manufacturer pre-settings), and updates 882 the device management database with the information obtained from the playback device. The control server further updates 884 Discover functional interface accordingly. In an alternate embodiment, the control server may periodically issue a discovery for playback devices request without any specific request.

Figure 4D:
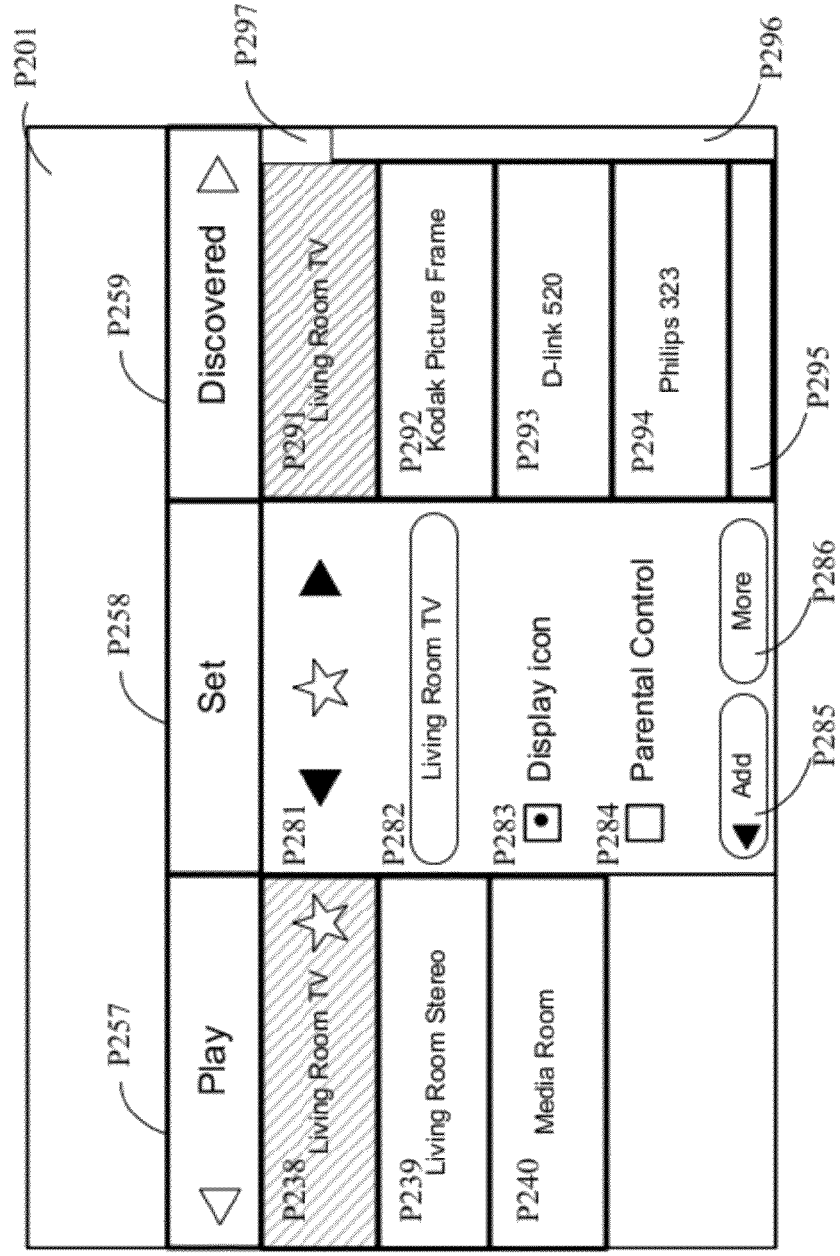

FIG. 4D illustrates a virtual porthole that displays Play P257, Set P258 and Discovered P259 functional interfaces after user interactions with a control server illustrated in FIG. 8D. Play interface P257 provides a personalized sub-list of playback devices available for playing content. A user may select a playback device (e.g., Living Room TV P238) from the Play functional interface by interacting with the virtual porthole through user input options provided by the control point device. A user can select a playback device (e.g., D-link 520) listed in Discovered functional interface. Once a playback device is selected, the personalize Set interface provides settings for configuring the media device in the network environment 150 associated with the selected playback device, e.g. a display icon P281, a description text P282, or a parental control indication P284. Set functional interface may include much more information for each playback device, and the user can navigate inside Set functional interface P258 to view or interact with a selected playback device through a "More" button P286 or an "Add" button P285.

Discovered interface P259 provides a list of media devices automatically discovered in the network environment 150, for example using the UPnP discovery mechanism. Other embodiments can use other standard or proprietary discovery mechanisms. After initialization of the control server (e.g. NAS 181 in the network environment 150), the control server broadcasts a user "playback device discovery" request to all playback devices in the network environment 150, and accepts identifications for each responding playback device. For each discovered device, if the device is has already registered to the system, the control server retrieves this information from the device management database. Otherwise, the control server retrieves the information from the device itself (e.g. the manufacturer pre-settings) and updates Discovered functional interface.

Though the functional interfaces (e.g., Play, Plug, Set, Discovered, etc) described above are used to control media devices, in different embodiments, the functional interfaces may be used to control non-media devices or a combination of media and non-media devices. For example, the functional interfaces may be implemented to control electronic appliances in a smart home or machinery in a commercial or industrial setting.

The disclosed embodiments beneficially allow for a user interface device and methods that efficiently enhance consumer experience of media content on a variety of playback devices. A GUI-based media controller provides an intuitive visualization of media content navigation with unified media devices controlling. The GUI-based controller allows a user to access the variety of media content from heterogeneous media content providers and to allow the user to navigate the media content via a wide set of media devices.

Some portions of above description describe the embodiments in terms of algorithmic descriptions and processes, e.g., as with the description within FIGS. 7-8D. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor, for example, as described in FIG. 5. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for controlling a plurality of electronic devices connected through a network via a unified control point. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for facilitating controlling of one or more media objects connected to a network through a control server, the method comprising:
   receiving, from a control point, a user profile associated with a user of the control point and one or more display parameters of a screen of the control point, wherein the control point comprises a view area configured to display one or more predefined functional interfaces according to a predefined configuration, at least one of the functional interfaces having one or more immediate neighboring functional interfaces according to the predefined configuration, an immediate neighboring functional interface of a selected functional interface being the functional interfaces immediately adjacent to the selected functional interface, the control point being a device or module connected to the control server, the functional interfaces being for controlling media objects, media objects comprising media devices in the network and media content in the network for processing by at least one of the media devices;
   selecting a first subset of the plurality of predefined functional interfaces to be displayed by the view area based on the user profile and the display parameters of the screen of the control point, wherein each functional interface of the first subset of the plurality of the predefined functional interfaces is configured to control one or more media objects associated with the functional interface, and is further configured to interact with its immediate neighboring functional interfaces according to the predefined configuration, wherein an immediate neighboring functional interface of a selected functional interface is the functional interfaces immediately adjacent to the selected functional interface, and wherein each functional interface has one or more user menus;
   transmitting the selected first subset of the plurality of the predefined functional interfaces to the control point;
   receiving a user request from the control point, wherein the user request corresponds to one or more selections of user menu items within the first subset of the plurality of the functional interfaces, and each selection of user menu item corresponds to a command to control the media object associated with the selected menu;
   selecting a second subset of the plurality of the functional interfaces based on the user request; and
   transmitting the second subset of the plurality of the functional interfaces to the control point.

2. The method of claim 1, wherein the predefined configuration comprises a linear arrangement of the functional interfaces to be displayed on the screen of the control point, and the functional interfaces are navigable in either a first linear direction or a second linear direction, wherein a user selection of a menu item from a functional interface transmits a signal to update operations of the media objects associated with the immediate neighboring functional interfaces in one of the linear direction.

3. The method of claim 1, wherein the predefined configuration is a two-dimensional arrangement of the functional interfaces to be displayed on the screen of the control point, and the functional interfaces are navigable within a first axis and a second axis of a two-dimensional plane, wherein a user selection of a menu item from a functional interface transmits a signal to update operations of the media objects associated with the immediate neighboring functional interfaces within the first axis and the second axis.

4. The method of claim 1,
   wherein the predefined configuration is a three-dimensional arrangement of the functional interfaces to be displayed on the screen of the control point, and the functional interfaces are navigable within a first axis, a second axis, a third axis of a three-dimensional space, or within two of the first axis, the second axis and the third axis,
   wherein a user selection of a menu item from a functional interface transmits a signal to update operations of the media objects associated with the immediate neighboring functional interfaces in the three-dimensional space.

5. The method of claim 1, wherein the display parameters of the screen of the control point are determined based on at least one of a size of the screen, a resolution of the screen and a processing capability of the control point.

6. The method of claim 1, wherein selecting the second subset of the plurality of the functional interfaces comprises selecting the second subset of the plurality of the functional interfaces based on the user request being one of a navigation request, playback device discovery request, a content search request, and a content playback request.

7. The method of claim 6, further comprising:
   responsive to the user request being a navigation request, wherein the navigation request corresponds to movement from one functional interface to an adjacent functional interface of the first set of the functional interface:
   changing a plurality of pointers of the first subset of plurality of the functional interfaces currently displayed on the screen of the control point, wherein each pointer is associated with a functional interface in the first subset of the functional interfaces; and setting a plurality of new pointers to the second subset of the plurality of the functional interfaces, wherein each new pointer is associated with a functional interface in the second subset of the functional interfaces.

8. The method of claim 6, further comprising:
responsive to the user request being a content search request, wherein the content search request comprises at least one of a plurality of resources to be searched, a set of search filters and a user identification: for each resource to be searched:
determining whether the resource is stored in a local storage;
in response to the resource stored locally, searching the local storage;
in response to the resource not stored locally, searching a plurality of content providers connected to the network; merging search results from one or more content providers into one search result; and
updating the first subset of the plurality of the functional interfaces with the search result.

9. The method of claim 6, further comprising:
responsive to the user request being a playback device discovery request, wherein the playback device discovery request comprises at least one of device parameters and a device identification associated with each playback device: broadcasting the playback device discovery request to a plurality of playback devices connected to the network; for each playback device connected to the network: authenticating the playback device;
in response to the playback device being known in the network, retrieving information about the playback device from a device management database;
in response to the playback device not being known in the network, collecting information directly from the playback device itself and updating the device management database; and generating a response that includes a list of the authenticated playback devices.

10. The method of claim 6, further comprising:
responsive to the user request being a content playback request, wherein the content playback request comprises a name of the content to be played and an identification of a playback device:
determining whether the playback device is capable of playing back the content; in response to the playback device being capable of playing back the content: retrieving the content from a media content storage; playing the content on the playback device; and
in response to the playback device being incapable of playing back the content, sending notification of status of the playback device to the control point.

11. The method of claim 1,
wherein the second subset of the plurality of the functional interfaces is the reselected first subset of the plurality of the functional interfaces,
wherein the reselected first subset of the plurality of the functional interfaces are updated based on the processing result of the user request.

12. The method of claim 1, wherein the predefined configuration of the plurality of the functional interfaces is a linear arrangement of the functional interfaces, and a subset of the plurality of the functional interfaces is navigable in either a first or a second direction linearly, wherein a user selection of a menu item from a functional interface transmits a signal to update operations of the media objects associated with the immediate neighboring functional interfaces in one of the linear direction.

13. The method of claim 1, wherein the predefined configuration of the plurality of the functional interfaces is a two-dimensional arrangement of the functional interfaces, and a subset of the functional interfaces is navigable within a first axis and a second axis in a two-dimensional plane, wherein a user selection of a menu item from a functional interface transmits a signal to update operations of the media objects associated with the immediate neighboring functional interfaces within the first axis and the second axis.

14. The method of claim 1, wherein the predefined configuration of the plurality of the functional interfaces is a three-dimensional arrangement of the functional interfaces, and a subset of the functional interfaces is navigable within a first axis, a second axis, a third axis in a three-dimensional space, or within two of the first axis, the second axis and the third axis, wherein a user selection of a menu item from a functional interface transmits a signal to update operations of the media objects associated with the immediate neighboring functional interfaces in the three-dimensional space.

15. A computer implemented method for facilitating controlling of one or more objects connected to a network through a control server, the method comprising:
based on a user profile of an identified user of a plurality of users and one or more display parameters of a screen of a control point, selecting a first subset of a plurality of functional interfaces, the first subset to be displayed in a view area of a control point according to a predefined configuration, at least one of the functional interfaces having one or more immediate neighboring functional interfaces according to the predefined configuration, an immediate neighboring functional interface of a selected functional interface being the functional interfaces immediately adjacent to the selected functional interface, wherein each of the plurality of the functional interfaces of the first subset includes one or more user menu items, is operative to control one or more media objects associated with the functional interface, and is further configured to interact with its immediate neighboring functional interfaces according to the predefined configuration, media objects comprising media devices couple to the network and media content couple to the network for processing by at least one of the media devices;
transmitting the selected first subset of the plurality of the predefined functional interfaces to the control point, such that the control point, in response to receiving the transmitted second subset, displays the second subset in the view area;
receiving a user request from the control point, wherein the user request corresponds to one or more selections of one or more of the user menu items within the first subset of the plurality of the functional interfaces, and each selection of user menu item corresponds to a command to control the media object associated with the selected one or more menu items;
in response to the received user request, selecting a second subset of the plurality of the functional interfaces based on the user request; and
transmitting the second subset of the plurality of the functional interfaces to the control point such that the control point, in response to receiving the transmitted second subset, displays the second subset in the view area.

16. A non-transitory computer-readable medium for facilitating controlling of a plurality of media objects connected to a network through a control server, the transitory computer-readable medium comprising program code that when executed causes:

based on a user profile of an identified user of a plurality of users and one or more display parameters of a screen of a control point, selecting a first subset of a plurality of functional interfaces, the first subset to be displayed in a view area of the screen of the control point according to a predefined configuration, at least one of the functional interfaces having one or more immediate neighboring functional interfaces according to the predefined configuration, an immediate neighboring functional interface of a selected functional interface being the functional interfaces immediately adjacent to the selected functional interface, wherein each of the plurality of the functional interfaces of the first subset includes one or more user menu items, is operative to control one or more media objects associated with the functional interface, and is further configured to interact with its immediate neighboring functional interfaces according to the predefined configuration, and wherein each functional interface has one or more user menus, media objects comprising media devices couple to the network and media content couple to the network for processing by at least one of the media devices;

transmitting the selected first subset of the plurality of the predefined functional interfaces to the control point, such that the control point, in response to receiving the transmitted second subset, displays the second subset in the view area;

receiving a user request from the control point, wherein the user request corresponds to one or more selections of one or more of the user menu items within the first subset of the plurality of the functional interfaces, and each selection of user menu item corresponds to a command to control the device associated with the selected one or more menu item items;

in response to the received user request, selecting a second subset of the plurality of the functional interfaces based on the user request; and transmitting the second subset of the plurality of the functional interfaces to the control point, such that the control point in response to receiving the transmitted second subset, displays the second subset in the view area.

17. The non-transitory computer-readable medium of claim 16, wherein the program code when executed further causes selecting the second subset of the plurality of the functional interfaces comprises program code for selecting the second subset of the plurality of the functional interfaces based on the user request being one of a navigation request, playback device discovery request, a content search request, and a content playback request.

18. The non-transitory computer-readable medium of claim 17, wherein the program code when executed further causes:

responsive to the user request being a navigation request, wherein the navigation request corresponds to movement from one functional interface to an adjacent functional interface of the first set of the functional interface:

changing a plurality of pointers of the first subset of plurality of the functional interfaces currently displayed on the screen of the control point, wherein each pointer is associated with a functional interface in the first subset of the functional interfaces; and setting a plurality of new pointers to the second subset of the plurality of the functional interfaces, wherein each new pointer is associated with a functional interface in the second subset of the functional interfaces.

19. The non-transitory computer-readable medium of claim 17, wherein the program code when executed further causes: responsive to the user request being a content search request, wherein the content search request comprises at least one of a plurality of resources to be searched, a set of search filters and a user identification: for each resource to be searched:

determining whether the resource is stored in a local storage; in response to the resource stored locally, searching the local storage; in response to the resource not stored locally, searching a plurality of content providers connected to the network; merging search results from one or more content providers into one search result; and updating the first subset of the plurality of the functional interfaces with the search result.

20. The non-transitory computer-readable medium of claim 17, wherein the program code when executed further causes:

responsive to the user request being a playback device discovery request, wherein the playback device discovery request comprises at least one of device parameters and a device identification associated with each playback device: broadcasting the playback device discovery request to a plurality of playback devices connected to the network; for each playback device connected to the network: authenticating the playback device;

in response to the playback device being known in the network, retrieving information about the playback device from a device management database;

in response to the playback device not being known in the network, collecting information directly from the playback device itself and updating the device management database; and generating a response that includes a list of the authenticated playback devices.

21. The non-transitory computer-readable medium of claim 17, wherein the program code when executed further causes: responsive to the user request being a content playback request, wherein the content playback request comprises a name of the content to be played and an identification of a playback device:

determining whether the playback device is capable of playing back the content; in response to the playback device being capable of playing back the content: retrieving the content from a media content storage; playing the content on the playback device; and in response to the playback device being incapable of playing back the content, sending notification of status of the playback device to the control point.

22. The non-transitory computer-readable medium of claim 16, wherein the second subset of the plurality of the functional interfaces is the reselected first subset of the plurality of the functional interfaces, wherein the reselected first subset of the plurality of the functional interfaces are updated based on the processing result of the user request.

23. The non-transitory computer-readable medium of claim 16, wherein the predefined configuration of the plurality of the functional interfaces is a linear arrangement of the functional interfaces, and a subset of the plurality of the functional interfaces is navigable in either a first or a second direction linearly, wherein a user selection of a menu item from a functional interface transmits a signal to update operations of the media objects associated with the immediate neighboring functional interfaces in one of the linear direction.

24. The non-transitory computer-readable medium of claim 16, wherein the predefined configuration of the plurality of the functional interfaces is a two-dimensional arrangement of the functional interfaces, and a subset of the functional interfaces is navigable within a first axis and a second axis in a two-dimensional plane, wherein a user selection of a menu item from a functional interface transmits a signal to update operations of the media objects associated with the immediate neighboring functional interfaces within the first axis and the second axis.

25. The non-transitory computer-readable medium of claim 16, wherein the predefined configuration of the plurality of the functional interfaces is a three-dimensional arrangement of the functional interfaces, and a subset of the functional interfaces is navigable within a first axis, a second axis, a third axis in a three-dimensional space, or within two of the first axis, the second axis and the third axis, wherein a user selection of a menu item from a functional interface transmits a signal to update operations of the media objects associated with the immediate neighboring functional interfaces in the three-dimensional space.

* * * * *